(12) United States Patent
Xu

(10) Patent No.: US 12,495,289 B2
(45) Date of Patent: Dec. 9, 2025

(54) METHOD AND APPARATUS FOR IMPROVED CAPABILITY EXPOSURE AT EDGE ENABLER SERVER

(71) Applicant: Telefonaktiebolaget LM Ericsson (publ), Stockholm (SE)

(72) Inventor: Wenliang Xu, Shanghai (CN)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 327 days.

(21) Appl. No.: 18/029,282

(22) PCT Filed: Aug. 27, 2021

(86) PCT No.: PCT/EP2021/073719
§ 371 (c)(1),
(2) Date: Mar. 29, 2023

(87) PCT Pub. No.: WO2022/069121
PCT Pub. Date: Apr. 7, 2022

(65) Prior Publication Data
US 2023/0370834 A1    Nov. 16, 2023

(30) Foreign Application Priority Data

Sep. 30, 2020   (WO) ................ PCT/CN2020/119342

(51) Int. Cl.
*H04W 4/00*    (2018.01)
*H04W 8/18*    (2009.01)
*H04W 28/02*   (2009.01)
*H04W 48/16*   (2009.01)

(52) U.S. Cl.
CPC ....... *H04W 8/186* (2013.01); *H04W 28/0215* (2013.01); *H04W 48/16* (2013.01)

(58) Field of Classification Search
CPC .. H04W 8/186; H04W 28/0215; H04W 48/16
USPC ......................................................... 370/329
See application file for complete search history.

(56) References Cited

FOREIGN PATENT DOCUMENTS

WO    2019/243174 A1    12/2019

OTHER PUBLICATIONS

Ericsson, "Support group-based location exposure", 3GPP TSG SA WG6 #039-BIS-e, S6-201770, e-meeting, Oct. 20, 2020 (28 pages).
Ericsson, "Introduction of list of SUPIs for Event Exposure", S2-2002766, 3GPP SA WG2 Meeting #S2-138E, Apr. 20-24, 2020, Electronic meeting (10 pages).
SA WG2, "Presentation of TS 23.288: Architecture enhancements for 5G System (5GS) to support network data analytics services (Release 16)", 3GPP TSG SA #84, SP-190456, Jun. 7, 2019 Newport Beach, USA (8 pages).

(Continued)

*Primary Examiner* — Temica M Beamer
(74) *Attorney, Agent, or Firm* — Rothwell, Figg, Ernst & Manbeck, P.C.

(57) ABSTRACT

Various embodiments of the present disclosure provide methods and apparatuses for improved capability exposure at an edge enabler entity. The method implemented at the edge enabler entity comprises receiving a request for an exposure capability of 3GPP core network from an edge application entity, the request comprising a user equipment, UE, group identifier identifying a group of UEs. The method further comprises communicating with the 3GPP core network based on the request, and transmitting a response to the edge application entity.

19 Claims, 11 Drawing Sheets

(56) References Cited

OTHER PUBLICATIONS

SA WG6, "Presentation of TS 23.558 v1.0.0 for information", 3GPP TSG SA #89E, SP-200828, Online Sep. 21, 2020 (19 pages).
International Search Report and Written Opinion issued in International Application No. PCT/EP2021/073719 dated Jan. 24, 2022 (16 pages).
3GPP TS 23.558 V1.0.0 (Sep. 2020), 3rd Generation Partnership Project; Technical Specification Group Services and System Aspects; Architecture for enabling Edge Applications; (Release 17), Sep. 2020 (103 pages).
3GPP TR 23.791 V16.2.0 (Jun. 2019), 3rd Generation Partnership Project; Technical Specification Group Services and System Aspects; Study of Enablers for Network Automation for 5G (Release 16), Jun. 2019 (124 pages).
3GPP TS 29.520 V16.5.0 (Sep. 2020), 3rd Generation Partnership Project; Technical Specification Group Core Network and Terminals; 5G System; Network Data Analytics Services; Stage 3 (Release 16), Sep. 2020 (91 pages).
3GPP TS 23.501 V16.6.0 (Sep. 2020), 3rd Generation Partnership Project; Technical Specification Group Services and System Aspects; System architecture for the 5G System (5GS); Stage 2 (Release 16), Sep. 2020 (447 pages).
3GPP TS 23.502 V16.6.0 (Sep. 2020), 3rd Generation Partnership Project; Technical Specification Group Services and System Aspects; Procedures for the 5G System (5GS); Stage 2 (Release 16), Sep. 2020 (597 pages).
3GPP TS 23.288 V16.5.0 (Sep. 2020), 3rd Generation Partnership Project; Technical Specification Group Services and System Aspects; Architecture enhancements for 5G System (5GS) to support network data analytics services (Release 16), Sep. 2020 (66 pages).

METHOD AND APPARATUS FOR IMPROVED CAPABILITY EXPOSURE AT EDGE ENABLER SERVER

CROSS REFERENCE TO RELATED APPLICATIONS

This application is a 35 U.S.C. § 371 National Stage of International Patent Application No. PCT/EP2021/073719, filed 2021 Aug. 27, which claim priority to International Patent Application No. PCT/CN2020/119342, filed 2020 Sep. 30. The above identified applications are incorporated by this reference.

FIELD OF THE INVENTION

The present disclosure generally relates to the field of edge computing, and more specifically, to a method and apparatus for improved capability exposure at an edge enabler server.

BACKGROUND

This section introduces aspects that may facilitate a better understanding of the disclosure. Accordingly, the statements of this section are to be read in this light and are not to be understood as admissions about what is in the prior art or what is not in the prior art.

I. Edge Computing Application Enabler Introduction

3GPP TS23.558 v1.0.0 specifies application layer architecture, procedures and information flows necessary for enabling edge applications over 3GPP networks. It includes architectural requirements for enabling edge applications, application layer architecture fulfilling the architecture requirements and procedures to enable the deployment of edge applications.

One of main areas focused on is to minimize an impact to edge based applications, so that they do not need major application redevelopment for user equipment (UE) use at the Edge.

FIG. 1 shows the architecture for enabling edge applications. The Edge Data Network (EDN) is a local Data Network. Edge Application Server(s) and an Edge Enabler Server (EES) are contained within the EDN. An Edge Configuration Server provides configurations related to the EES, including details of the Edge Data Network hosting the EES. The UE contains Application Client(s) and an Edge Enabler Client. The Edge Application Server(s), the Edge Enabler Server and the Edge Configuration Server may interact with the 3GPP Core Network.

EDGE-3 reference point enables interactions between the Edge Enabler Server and the Edge Application Server(s). It supports:
a) registration of Edge Application Server(s) with availability information (e.g. time constraints, location constraints);
b) de-registration of Edge Application Server(s) from the Edge Enabler Server;
c) providing access to network capability information (e.g. location information); and
d) requesting setup of a data session between an Application Client and the Edge Application Server with a specific QoS.

II. EES Capability Exposure to Edge Application Server (EAS)

One important functionality in the edge enabling layer is EES exposed capabilities which include EES capabilities and exposed 3GPP Core Network capabilities. The 3GPP Core Network capabilities may be exposed from the EES to the Edge Application Server(s) with enhancement. The re-exposed 3GPP Core Network capabilities may be:
1) UE location API (Application Programming Interface);
2) User Plane Path management API; and
3) Session with QoS API.

SUMMARY

This summary is provided to introduce a selection of concepts in a simplified form that are further described below in the detailed description. This summary is not intended to identify key features or essential features of the claimed subject matter, nor is it intended to be used to limit the scope of the claimed subject matter.

The present disclosure proposes methods and apparatuses for improved capability exposure at the EES, especially for the re-exposed 3GPP core network capabilities via the EES.

According to a first aspect of the present disclosure, there is provided a method implemented at an edge enabler entity. The method comprises receiving a request for an exposure capability of 3GPP core network from an edge application entity, the request comprising a user equipment, UE, group identifier identifying a group of UEs. The method further comprises communicating with the 3GPP core network based on the request, and transmitting a response to the edge application entity.

In accordance with an exemplary embodiment, the UE group identifier may be an internal group identifier, or an external group identifier.

In accordance with an exemplary embodiment, the exposure capability may be UE location exposure capability, or user plane path management exposure capability, or session with quality of service, QoS, exposure capability.

In accordance with an exemplary embodiment, the exposure capability may be the UE location exposure capability, and the request may be a UE location subscribe request, and the response may be a UE location subscribe response. In the embodiment, communicating with the 3GPP core network may comprise subscribing to UE location for the group of UEs identified by the UE group identifier, and subscribing to UE expected behavior analytics for the group of UEs.

In accordance with an exemplary embodiment, the UE expected behavior analytics may comprise UE mobility analytics.

In accordance with an exemplary embodiment, the method may further comprise detecting UE location information of a UE in the group of UEs; determining whether to aggregate the UE location information for the group of UEs and determining an aggregation period, based on analytics results of the UE expected behavior analytics received from the 3GPP core network, a local policy of the edge enabler entity, and UE location subscription information for the group of UEs received from the edge application entity; in response to determining to aggregate the UE location information, aggregating the detected UE location information of one or more UEs of the group of UEs for the aggregation period, and transmitting a UE location notification to the edge application entity, wherein the UE location notification comprises the aggregated UE location information in which each piece of UE location information comprises a UE identifier identifying the UE, a location of the UE, and a location type indicating whether the UE location is actual or predictive; and in response to determining not to aggregate the UE location information, transmitting a UE location notification comprising the detected UE location information of the UE to the edge application entity.

In accordance with an exemplary embodiment, detecting UE location information of a UE in the group of UEs may comprise at least one of: receiving the UE location information of the UE in the group of UEs from the 3GPP core network; and retrieving the UE location information of the UE in the group of UEs from the analytics results of the UE expected behavior analytics.

In accordance with an exemplary embodiment, the analytics results of the UE expected behavior analytics may comprise UE mobility statistics and UE mobility predictions. In the embodiment, the determining may be based on the UE mobility statistics, and the retrieving may be based on the UE mobility predictions.

In accordance with an exemplary embodiment, the UE location subscription information may comprise a group reporting guard time.

In accordance with an exemplary embodiment, the method may further comprise receiving a UE location subscription update request from the edge application entity, updating the UE location subscription associated with the UE location subscription update request, updating, in response the UE location subscription update request relating to the UE location subscription for the group of UEs, the UE expected behavior analytics subscription, and transmitting a UE location subscription update response to the edge application entity.

In accordance with an exemplary embodiment, the method may further comprise receiving a UE location unsubscribe request from the edge application entity, unsubscribing from the UE location associated with the UE location unsubscribe request, unsubscribing, in response to the UE location unsubscribe request relating to the UE location subscription for the group of UEs, from the UE expected behavior analytics, and transmitting a UE location unsubscribe response to the edge application entity.

In accordance with an exemplary embodiment, the exposure capability may be the user plane path management exposure capability, and the request may be a user plane path management event subscribe request, and the response may be a user plane path management event subscribe response. In the embodiment, communicating with the 3GPP core network may comprise checking a user plane path management event for the group of UEs identified by the UE group identifier, and subscribing to UE expected behavior analytics for the group of UEs.

In accordance with an exemplary embodiment, the UE expected behavior analytics may comprise both UE mobility analytics and UE communication analytics.

In accordance with an exemplary embodiment, the method may comprise detecting the user plane path management event of a UE in the group of UEs; determining whether to aggregate the user plane path management events for the group of UEs and determining an aggregation period, based on analytics results of the UE expected behavior analytics received from the 3GPP core network, a local policy of the edge enabler entity, and user plane path management event subscription information for the group of UEs received from the edge application entity; in response to determining to aggregate the user plane path management events, aggregating the detected user plane path management events of one or more UEs of the group of UEs for the aggregation period, and transmitting a user plane path management event notification to the edge application entity, wherein the user plane path management event notification comprises the aggregated user plane path management events; and in response to determining not to aggregate the user plane path management events, transmitting a user plane path management event notification comprising the detected user plane path management event of the UE to the edge application entity.

In accordance with an exemplary embodiment, detecting the user plane path management event of a UE in the group of UEs may comprise receiving a user plane path management event notification for the UE in the group of UEs from the 3GPP core network.

In accordance with an exemplary embodiment, the analytics results of the UE expected behavior analytics may comprise UE mobility statistics and UE communication statistics.

In accordance with an exemplary embodiment, the user plane path management event subscription information may comprise a group reporting guard time and an indication of edge application server, EAS, acknowledgement.

In accordance with an exemplary embodiment, the method may further comprise receiving a user plane path management event subscription update request from the edge application entity, checking the user plane path management event associated with the user plane path management event subscription update request, updating, in response the user plane path management event subscription update request relating to the user plane path management event subscription for the group of UEs, the UE expected behavior analytics subscription, and transmitting a user plane path management event subscription update response to the edge application entity.

In accordance with an exemplary embodiment, the method may further comprise receiving a user plane path management event unsubscribe request from the edge application entity, unsubscribing from the user plane path management event associated with the user plane path management event unsubscribe request, unsubscribing, in response to the user plane path management event unsubscribe request relating to the user plane path management event subscription for the group of UEs, from the UE expected behavior analytics, and transmitting a user plane path management event unsubscribe response to the edge application entity.

In accordance with an exemplary embodiment, the exposure capability may be the session with QoS exposure capability, and the request may be a session with QoS create request, and the response may be the session with QoS create response. In the embodiment, communicating with the 3GPP core network may comprise subscribing to protocol data unit, PDU, session status monitoring for the group of UEs identified by the UE group identifier, retrieving one or more IP addresses of one or more UEs in the group of UEs which already has an ongoing data session with the edge application entity, and requesting a data session with a specific QoS for each of the one or more UEs.

In accordance with an exemplary embodiment, the method may further comprise, after transmitting the session with QoS create response, receiving, from the 3GPP core network, a PDU session status notification comprising an IP address of a UE in the group of UEs, requesting a data session with a specific QoS for the UE, and transmitting a session with QoS event notification for the UE to the edge application entity, the session with QoS event notification indicating events related to the requested data session with the specific QoS.

In accordance with an exemplary embodiment, the method may further comprise receiving a session with QoS update request from the edge application entity, updating, when the IP address of the UE with which the session with QoS update request is associated is known by the edge enabler entity, the data session with the specific QoS of the UE, and transmitting a session with QoS update response to the edge application entity.

In accordance with an exemplary embodiment, the method may further comprise receiving a session with QoS revoke request from the edge application entity, unsubscribing from the PDU session status monitoring for the group of UEs with which the session with QoS revoke request is associated, revoking the data session with the specific QoS associated with the session with QoS revoke request, and transmitting a session with QoS revoke response to the edge application entity.

According to a second aspect of the present disclosure, there is provided a method implemented at an edge application entity. The method comprises transmitting a request for an exposure capability of 3GPP core network to an edge enabler entity, the request comprising a user equipment, UE, group identifier identifying a group of UEs, and receiving a response from the edge enable entity.

In accordance with an exemplary embodiment, the exposure capability may be the UE location exposure capability, and the request may be a UE location subscribe request, and the response may be a UE location subscribe response. In the embodiment, the method may further comprise at least one of: receiving a UE location notification from the edge enabler entity, wherein the UE location notification comprises aggregated UE location information of one or more UEs in the group of UEs in which each piece of UE location information comprises a UE identifier identifying a UE in the group of UEs, a location of the UE, and a location type indicating whether the UE location is actual or predictive; and receiving a UE location notification comprising detected UE location information of a UE in the group of UEs from the edge enabler entity.

In accordance with an exemplary embodiment, the exposure capability may be the user plane path management exposure capability, and the request may be a user plane path management event subscribe request, and the response may be a user plane path management event subscribe response. In the embodiment, the method may further comprise at least one of: receiving a user plane path management event notification from the edge enabler entity, wherein the user plane path management event notification comprises aggregated user plane path management events of one or more UEs in the group of UEs; and receiving a user plane path management event notification comprising detected user plane path management event of a UE in the group of UEs from the edge enabler entity.

In accordance with an exemplary embodiment, the exposure capability may be the session with QoS exposure capability, and the request may be a session with QoS create request, and the response may be a session with QoS create response. In the embodiment, the method may further comprise, after receiving the session with QoS create response, receiving a session with QoS event notification for a UE in the group of UEs from the edge enabler entity, the session with QoS event notification indicating events related to a requested data session with a specific QoS of the UE.

According to a third aspect of the present disclosure, there is provided an edge enabler entity. The edge enabler entity may comprise one or more processors and one or more memories comprising computer program codes. The one or more memories and the computer program codes may be configured to, with the one or more processors, cause the edge enabler entity at least to perform any step of the method according to the first aspect of the present disclosure.

According to a fourth aspect of the present disclosure, there is provided an edge application entity. The edge application entity may comprise one or more processors and one or more memories comprising computer program codes. The one or more memories and the computer program codes may be configured to, with the one or more processors, cause the edge application entity at least to perform any step of the method according to the second aspect of the present disclosure.

According to a fifth aspect of the present disclosure, there is provided a method implemented at an edge enabler entity. The method comprises receiving a session with quality of service, QoS, create request from an edge application entity, the session with QoS create request comprising a user equipment, UE, identifier identifying a UE. The method further comprises subscribing to protocol data unit, PDU, session status monitoring for the UE with 3GPP core network; in the event of the UE already has an ongoing data session with the edge application entity, retrieving an IP address of the UE from the 3GPP core network, and requesting a data session with a specific QoS for the UE; and transmitting a session with QoS create response to the edge application entity.

In accordance with an exemplary embodiment, the method may further comprise, in the event of the UE has no ongoing data session with the edge application entity and after transmitting the session with QoS create response, receiving, from the 3GPP core network, a PDU session status notification comprising an IP address of the UE, requesting a data session with a specific QoS for the UE, and transmitting a session with QoS event notification for the UE to the edge application entity, the session with QoS event notification indicating events related to the requested data session with the specific QoS.

In accordance with an exemplary embodiment, the method may further comprise receiving a session with QoS update request from the edge application entity, updating, when the IP address of the UE with which the session with QoS update request is associated is known by the edge enabler entity, the data session with the specific QoS of the UE, and transmitting a session with QoS update response to the edge application entity.

In accordance with an exemplary embodiment, the method may further comprise receiving a session with QoS revoke request from the edge application entity, unsubscribing from the PDU session status monitoring for the UE with which the session with QoS revoke request is associated, revoking the data session with the specific QoS of the UE, and transmitting a session with QoS revoke response to the edge application entity.

According to a sixth aspect of the present disclosure, there is provided a method implemented at an edge application entity. The method comprises transmitting a session with quality of service, QoS, create request to an edge enabler entity, the session with QoS create request comprising a user equipment, UE, identifier identifying a UE, and receiving a session with QoS create response from the edge enabler entity.

In accordance with an exemplary embodiment, the method may further comprise, after receiving the session with QoS create response, receiving a user plane path management event notification for the UE from the edge enabler entity, the user plane path management event notification indicating events related to a requested data session with a specific QoS of the UE.

According to a seventh aspect of the present disclosure, there is provided an edge enabler entity. The edge enabler entity may comprise one or more processors and one or more memories comprising computer program codes. The one or more memories and the computer program codes may be configured to, with the one or more processors, cause the edge enabler entity at least to perform any step of the method according to the fifth aspect of the present disclosure.

According to an eighth aspect of the present disclosure, there is provided an edge application entity. The edge application entity may comprise one or more processors and one or more memories comprising computer program codes. The one or more memories and the computer program codes may be configured to, with the one or more processors, cause the edge application entity at least to perform any step of the method according to the sixth aspect of the present disclosure.

According to a nineth aspect of the present disclosure, there is provided a method implemented at an edge enabler entity. The method comprises receiving a subscribe request for an exposure capability of 3GPP core network from an edge application entity, the subscribe request comprising a user equipment, UE, identifier identifying a UE. The method further comprises dealing with the subscribe request, subscribing to UE expected behavior analytics for the UE with the 3GPP core network, and transmitting a subscribe response to the edge application entity.

In accordance with an exemplary embodiment, the exposure capability may be UE location exposure capability or user plane path management exposure capability.

In accordance with an exemplary embodiment, the exposure capability may be the UE location exposure capability. In the embodiment, the subscribe request may be a UE location subscribe request, and the subscribe response may be a UE location subscribe response. In the embodiment, the UE expected behavior analytics may comprise UE mobility analytics.

In accordance with an exemplary embodiment, the method may further comprise detecting UE location information of the UE; determining whether to aggregate the UE location information for the UE and determining an aggregation period, based on analytics results of the UE expected behavior analytics received from the 3GPP core network, a local policy of the edge enabler entity, and UE location subscription information for the UE received from the edge application entity; in response to determining to aggregate the UE location information, aggregating the detected UE location information of the UE for the aggregation period, and transmitting a UE location notification to the edge application entity, wherein the UE location notification comprises the aggregated UE location information in which each piece of UE location information comprises a location of the UE and a location type indicating whether the UE location is actual or predictive; and in response to determining not to aggregate the UE location information, transmitting a UE location notification comprising the detected UE location information of the UE to the edge application entity.

In accordance with an exemplary embodiment, the method may further comprise receiving a UE location subscription update request from the edge application entity, updating the UE location subscription of the UE with which the UE location subscription update request is associated, updating the UE expected behavior analytics subscription for the UE, and transmitting a UE location subscription update response to the edge application entity.

In accordance with an exemplary embodiment, the method may further comprise receiving a UE location unsubscribe request from the edge application entity, unsubscribing from the UE location of the UE with which the UE location unsubscribe request is associated, unsubscribing from the UE expected behavior analytics for the UE, and transmitting a UE location unsubscribe response to the edge application entity.

In accordance with an exemplary embodiment, the exposure capability may be the user plane path management exposure capability. In the embodiment, the subscribe request may be a user plane path management event subscribe request, and the subscribe response may be a user plane path management event subscribe response. In the embodiment, the UE expected behavior analytics may comprise both UE mobility analytics and UE communication analytics.

In accordance with an exemplary embodiment, the method may further comprise detecting the user plane path management event of the UE; determining whether to aggregate the user plane path management events for the UE and determining an aggregation period, based on analytics results of the UE expected behavior analytics received from the 3 GPP core network, a local policy of the edge enabler entity, and user plane path management event subscription information for the UE received from the edge application entity; in response to determining to aggregate the user plane path management events, aggregating the detected user plane path management events of the UE for the aggregation period, and transmitting a user plane path management event notification to the edge application entity, wherein the user plane path management event notification comprises the aggregated user plane path management events; and in response to determining not to aggregate the user plane path management events, transmitting a user plane path management event notification comprising the detected user plane path management event of the UE to the edge application entity.

In accordance with an exemplary embodiment, the method may further comprise receiving a user plane path management event subscription update request from the edge application entity, checking the user plane path management event of the UE with which the user plane path management event subscription update request is associated, updating the UE expected behavior analytics subscription for the UE, and transmitting a user plane path management event subscription update response to the edge application entity.

In accordance with an exemplary embodiment, the method may further comprise receiving a user plane path management event unsubscribe request from the edge application entity, unsubscribing from the user plane path management event of the UE with which the user plane path management event unsubscribe request is associated, unsubscribing from the UE expected behavior analytics for the UE, and transmitting a user plane path management event unsubscribe response to the edge application entity.

According to a tenth aspect of the present disclosure, there is provided an edge enabler entity. The edge enabler entity may comprise one or more processors and one or more memories comprising computer program codes. The one or more memories and the computer program codes may be configured to, with the one or more processors, cause the edge enabler entity at least to perform any step of the method according to the ninth aspect of the present disclosure.

According to an eleventh aspect of the present disclosure, there is provided a computer-readable medium having computer program codes embodied thereon which, when executed on a computer, cause the computer to perform any step of the method according to the first, second, fifth, sixth, ninth aspect of the present disclosure.

With the embodiments of the present disclosure, the EES capability exposure can be enriched, and can support the capability exposure for a group of UEs.

BRIEF DESCRIPTION OF THE DRAWINGS

The disclosure itself, the preferable mode of use and further objectives are best understood by reference to the following detailed description of the embodiments when read in conjunction with the accompanying drawings, in which.

DETAILED DESCRIPTION

Figure 1:
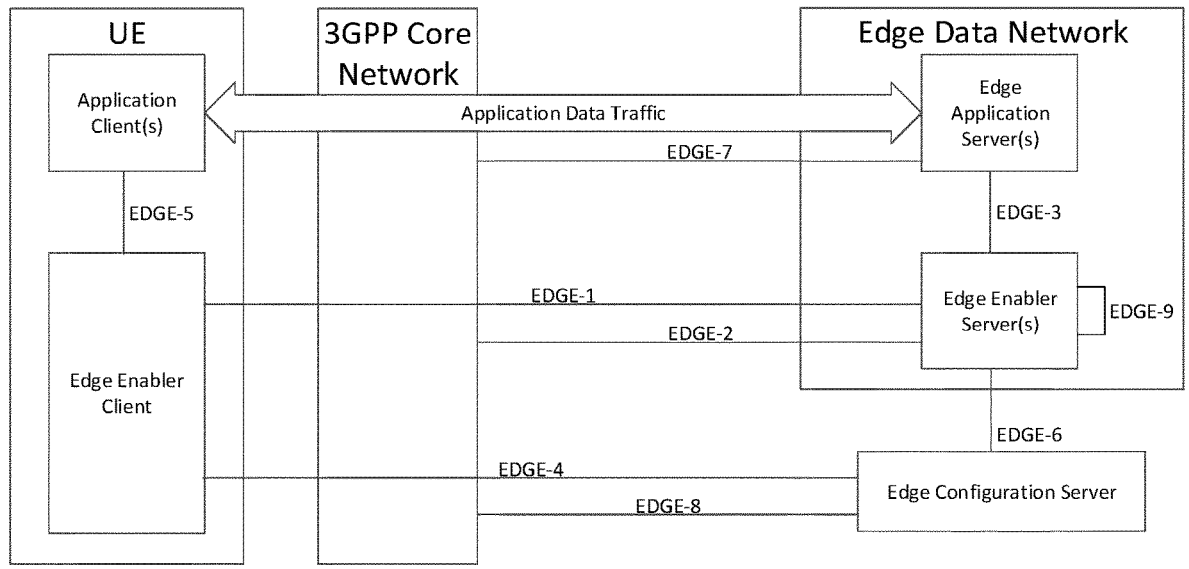
FIG. 1 is a diagram illustrating an architecture for enabling edge applications.

The embodiments of the present disclosure are described in detail with reference to the accompanying drawings. It should be understood that these embodiments are discussed only for the purpose of enabling those skilled persons in the art to better understand and thus implement the present disclosure, rather than suggesting any limitations on the scope of the present disclosure. Reference throughout this specification to features, advantages, or similar language does not imply that all of the features and advantages that may be realized with the present disclosure should be or are in any single embodiment of the disclosure. Rather, language referring to the features and advantages is understood to mean that a specific feature, advantage, or characteristic described in connection with an embodiment is included in at least one embodiment of the present disclosure. Furthermore, the described features, advantages, and characteristics of the disclosure may be combined in any suitable manner in one or more embodiments. One skilled in the relevant art will recognize that the disclosure may be practiced without one or more of the specific features or advantages of a particular embodiment. In other instances, additional features and advantages may be recognized in certain embodiments that may not be present in all embodiments of the disclosure.

As used herein, the term "3GPP core network" refers to 5G core (5GC) of 5G communication network or Evolved Packet Core (EPC) of Long Term Evolved (LTE) communication network.

The term "terminal device" refers to any end device that can access a communication network and receive services therefrom. By way of example and not limitation, the terminal device may refer to a user equipment (UE), or other suitable devices. The UE may be, for example, a subscriber station, a portable subscriber station, a mobile station (MS) or an access terminal (AT). The terminal device may include, but not limited to, portable computers, image capture terminal devices such as digital cameras, gaming terminal devices, music storage and playback appliances, a mobile phone, a cellular phone, a smart phone, a tablet, a wearable device, a personal digital assistant (PDA), a vehicle, and the like.

As yet another specific example, in an Internet of things (IoT) scenario, a terminal device may also be called an IoT device and represent a machine or other device that performs monitoring, sensing and/or measurements etc., and transmits the results of such monitoring, sensing and/or measurements etc. to another terminal device and/or a network equipment. The terminal device may in this case be a machine-to-machine (M2M) device, which may in a 3rd generation partnership project (3GPP) context be referred to as a machine-type communication (MTC) device.

As one particular example, the terminal device may be a UE implementing the 3GPP narrow band Internet of things (NB-IoT) standard. Particular examples of such machines or devices are sensors, metering devices such as power meters, industrial machinery, or home or personal appliances, e.g. refrigerators, televisions, personal wearables such as watches etc. In other scenarios, a terminal device may represent a vehicle or other equipment, for example, a medical instrument that is capable of monitoring, sensing and/or reporting etc. on its operational status or other functions associated with its operation.

As used herein, the terms "first", "second" and so forth refer to different elements. The singular forms "a" and "an" are intended to include the plural forms as well, unless the context clearly indicates otherwise. The terms "comprises", "comprising", "has", "having", "includes" and/or "including" as used herein, specify the presence of stated features, elements, and/or components and the like, but do not preclude the presence or addition of one or more other features, elements, components and/or combinations thereof. The term "based on" is to be read as "based at least in part on". The term "one embodiment" and "an embodiment" are to be read as "at least one embodiment". The term "another embodiment" is to be read as "at least one other embodiment". Other definitions, explicit and implicit, may be included below.

As described above, the re-exposed 3GPP core network capabilities from EES to EAS at EDGE-3 reference point may be UE location exposure capability (corresponding to UE location API), user plane path management exposure capability (corresponding to user plane path management API), or session with QoS exposure capability (corresponding to session with QoS API). Next, a brief introduction will be made for the above three exposure capabilities.

1. UE Location API

The Edge Enabler Server exposes the UE location API to an Edge Application Server in order to support tracking or checking a valid location of a UE. The UE location API exposed by the Edge Enabler Server relies on the 3GPP core network capabilities.

The Edge Application Server can request the UE location API for one-time reporting to check current UE's location and for continuous reporting to track UE's location. The UE location API supports both request-response model for one-time queries (in order to check UE's current location) and subscribe-notify model for providing UE's location to Edge Application Server on a continuous basis and enabling the Edge Application Server to track UE's location (as UE location changes).

Figure 2:
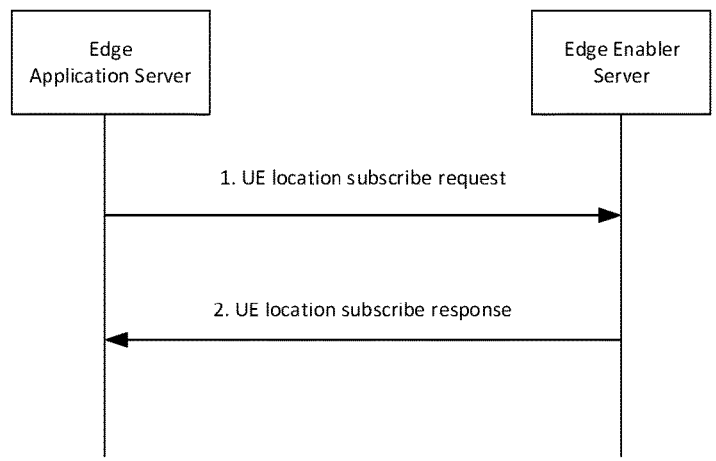
FIG. 2 is a diagram illustrating a subscribe operation for the existing UE location API.
Figure 3:
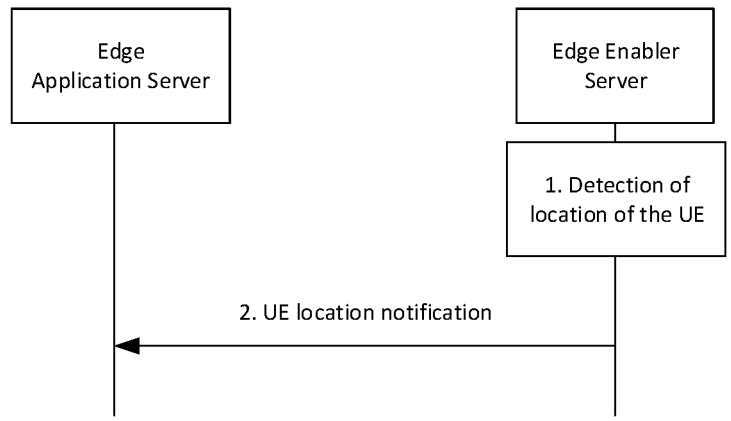
FIG. 3 is a diagram illustrating a notify operation for the existing UE location API.

FIGS. 2 and 3 illustrate a subscribe operation and a notify operation between the Edge Application Server and the Edge Enabler Server for the existing UE location API, respectively. As shown in FIG. 2, the Edge Application Server sends a UE location subscribe request comprising a UE identifier identifying a UE to the Edge Enabler Server, and the Edge Enabler Server responds with a UE location subscribe response. Table 1 shows the UE location subscribe request.

TABLE 1

| UE location subscribe request | | |
|---|---|---|
| Information element | Status | Description |
| UE ID | M | Identifies the UE for which location will be reported (e.g. GPSI, or an access token which not only identifies the UE, but also provides the end user's consent for reporting UE's location to a given EAS) |
| Security credentials | M | Security credentials of the EAS |
| Notification Target Address | M | Notification Target Address of the EAS where the notification is to be sent by the EES |
| Event reporting information (NOTE) | O | Event Reporting Information as specified in Table 4.15.1-1 of 3GPP TS 23.502, e.g. event reporting mode. |
| Proposed expiration time | O | Proposed expiration time for the subscription |
| Location Granularity | O | indicates format of location e.g. GPS Coordinates, Cell ID, Tracking Area ID, or civic addresses (e.g. streets, districts, etc.) that can be understood by the Edge Application Server |
| Location accuracy | O | Indicates accuracy of the location information |

(NOTE):
The Sampling ratio and Group Reporting Guard Time are not applicable in the present release.

As shown in FIG. 3, The Edge Enabler Server detects the location of the UE, and sends a UE location notification comprising the location of the UE to the Edge Application Server. Table 2 shows the UE location notification.

TABLE 2

| UE location notification | | |
|---|---|---|
| Information element | Status | Description |
| Subscription ID | M | Subscription identifier corresponding to the subscription stored in the EES for the request |
| UE location | M | Location of the UE |
| Timestamp | O | Indicates the age of the location information |
| Location accuracy | O | Indicates accuracy of the location information |

2. User Plane Path Management API

The Edge Enabler Server exposes user plane path management event notifications of a UE to an Edge Application Server (e.g. in order to trigger application context relocation). The user plane path management API exposed by the Edge Enabler Server may rely on Network Exposure Function (NEF) northbound API for monitoring event of user plane path management event.

Figure 4:
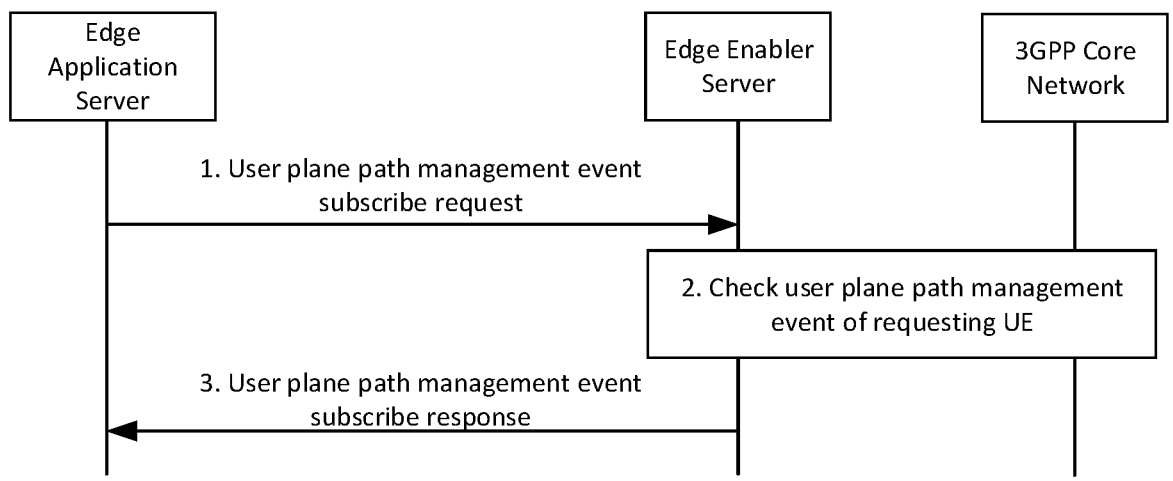
FIG. 4 is a diagram illustrating a subscribe operation for the existing user plane path management API.
Figure 5:
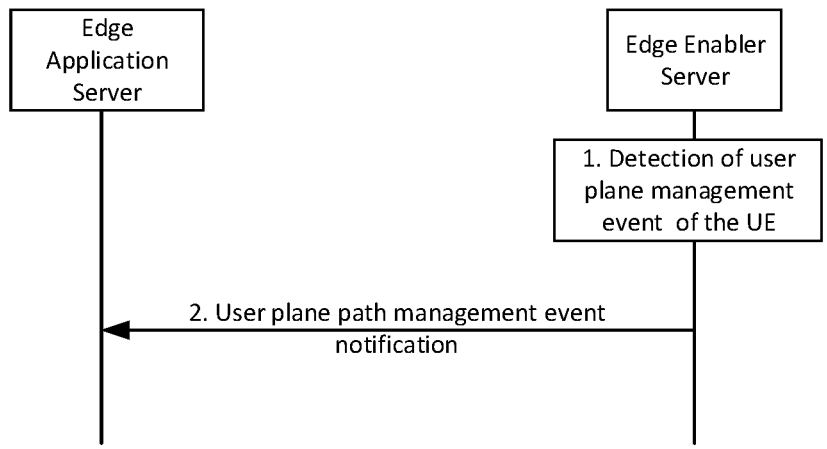
FIG. 5 is a diagram illustrating a notify operation for the existing user plane path management API.

FIGS. 4 and 5 illustrate a subscribe operation and a notify operation between the Edge Application Server and the Edge Enabler Server for the existing user plane path management API, respectively. As shown in FIG. 4, the Edge Application Server sends a user plane path management event subscribe request comprising a UE identifier identifying a UE to the Edge Enabler Server. The Edge Enabler Server checks the user plane path management event of the UE with the 3GPP core network, and responds with a user plane path management event subscribe response. Table 3 shown the user plane path management event subscribe request.

TABLE 3

| Information element | Status | Description |
| --- | --- | --- |
| UE Identifier | M | The identifier of the UE (i.e. GPSI or identity token) |
| Event ID(s) | M | Event ID(s) as specified in 3GPP TS 23.501 |
| Event Report | M | Event Reporting Information as specified in 3GPP TS 23.502 |
| Notification Target Address | M | Notification Target Address of the EAS where the notification is to be sent by the EES |
| Type of subscription | O | Indicates Early and/or Late notification to inform if the notification needs to be received before and/or after UP path configuration. |
| Indication of EAS acknowledgement | O | This IE indicates the EES to include indication of "AF acknowledgement to be expected" within the AF request for subscribing UP path management events to 3GPP network and that the EAS will provide an acknowledgement as a response for the notifications of UP path management events to the EES. |
| Event Filter | O | Event filter as specified in 3GPP TS 23.501 |

User plane path management event subscribe request

As shown in FIG. 5, the Edge Enabler Server detects the user plane path management of the UE, and sends a user plane path management event notification to the Edge Application Server.

3. Session with QoS API

The Edge Enabler Server exposes the Session with QoS API to the Edge Application Server in order to support setup of a data session between an Application Client and the Edge Application Server with a specific QoS and modification of the QoS of this data session.

The Session with QoS API exposed by the Edge Enabler Server relies on the northbound Policy Authorization Service API exposed by Policy Control Function (PCF) as specified in 3GPP TS 23.502 v16.6.0 and 3GPP TS 23.503 v16.6.0, if the Edge Enabler Server is connected to the PCF via N5 reference point, or on the northbound Application Function (AF) Session with QoS Service API exposed by the NEF as specified in 3GPP TS 23.502 v16.6.0 and 3GPP TS 23.503 v16.6.0, if the Edge Enabler Server is connected to the PCF via the NEF.

Figure 6:
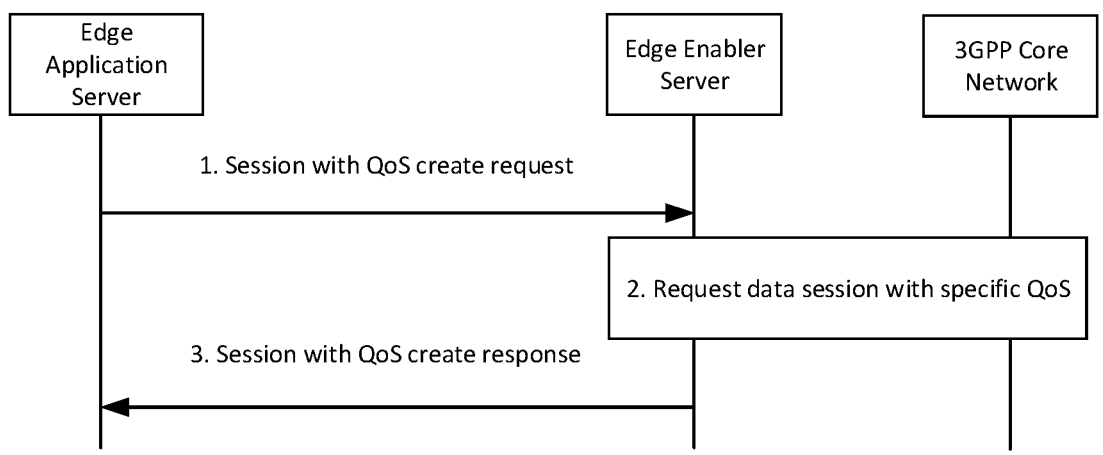
FIG. 6 is a diagram illustrating a create operation for the existing session with QoS API.
Figure 7:
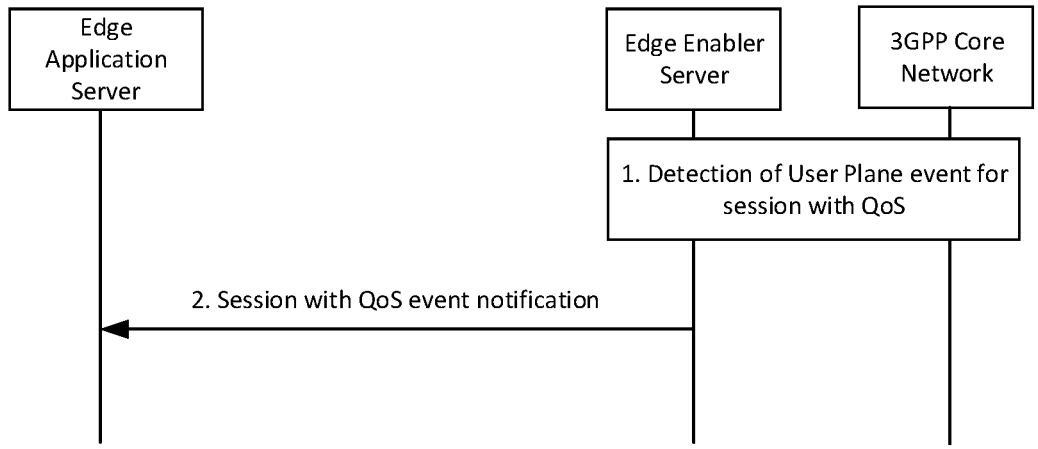
FIG. 7 is a diagram illustrating a notify operation for the existing session with QoS API.

FIGS. 6 and 7 illustrates a create operation and a notify operation between the Edge Application Server and the Edge Enabler Server for the existing session with QoS API, respectively. As shown in FIG. 6, the Edge Application sends a session with QoS create request comprising an IP address of a UE to the Edge Enabler Server. The Edge Enabler Server requests a data session with a specific QoS from the 3GPP core network, and responds with a session with QoS create response. Table 4 shows the session with QoS create request.

TABLE 4

| Information element | Status | Description |
| --- | --- | --- |
| UE IP address | M | The UE IP address. |
| Edge UE ID | O | Identifier uniquely identifying the UE in the EES. |
| IP flow description | M | The IP flow description for the application traffic. |
| Requested QoS reference (NOTE 1) | O | Refers to pre-defined QoS information for the data session between AC and EAS (NOTE 2). |
| Event list | O | A list of associated events to which the EAS subscribes (see 3GPP TS 23.503, clause 6.1.3.18) |
| Notification Target Address | O | Notification Target Address of the EAS where the notification is to be sent by the EES. |
| DNN | O | DNN for the data session between AC and EAS |
| S-NSSAI | O | S-NSSAI for the data session between AC and EAS |
| Requested bandwidth (NOTE 1) | O | Bandwidth requested for the data session between AC and EAS |

Session with QoS create request (NOTE 1):
Only one of requested QoS reference or requested bandwidth shall be provided.
(NOTE 2):
The pre-defined QoS information may be configured in the EES or in the 3GPP Core Network.

As shown in FIG. 7, the Edge Enabler Server detects a user plane event for the established session with QoS, and sends a session with QoS event notification to the Edge Application Server.

However, the existing EES exposure APIs mentioned above only support one single UE for the UE location API and the user plane path management API. As shown in Tables 1 and 3, the UE location subscribe request and the user plane path management event subscribe request comprise the identifier of the single UE, i.e. GPSI or identity token. Moreover, the session with QoS API only supports an IP address of a single UE as a target UE for an ongoing session. In addition, each notification is per UE. For example, the UE location notification only indicates the location of the single UE.

Therefore, it is desirable to provide an improved capability exposure solution with more add-on values which could be a high level abstract for ease of use or additional functions/features, to optimize the notification signaling over EDGE-3.

In accordance with some exemplary embodiments, the present disclosure provides improved capability exposure solutions at the Edge Enabler Server, which makes it possible for the Edge Application Server to invoke the EES capability exposure APIs for a group of UEs over EDGE-3.

It is noted that some embodiments of the present disclosure are mainly described in relation to 5G specifications being used as non-limiting examples for certain exemplary network configurations and system deployments. As such, the description of exemplary embodiments given herein specifically refers to terminology which is directly related thereto. Such terminology is only used in the context of the presented non-limiting examples and embodiments, and does not limit the present disclosure naturally in any way. Rather, any other system configuration or radio technologies may equally be utilized as long as exemplary embodiments described herein are applicable.

Figure 8:
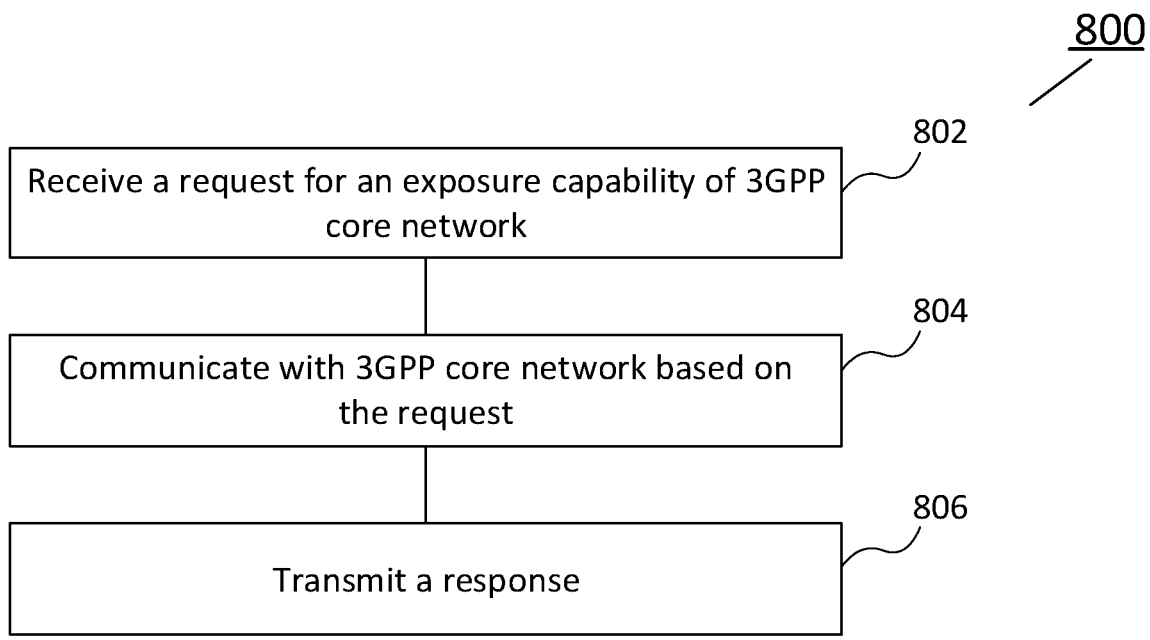
FIG. 8 is a flowchart illustrating a method implemented at an edge enabler entity according to some embodiments of the present disclosure.

FIG. 8 is a flowchart illustrating a method 800 for improved capability exposure according to some embodiments of the present disclosure. The method 800 illustrated in FIG. 8 may be performed by an apparatus implemented in or communicatively coupled to an edge enabler entity. In some embodiments, the edge enabler entity may be implemented either on a dedicated hardware, as a software instance running on a dedicated hardware, or as a virtualized function instantiated on an appropriate platform, e.g. on a cloud infrastructure. The Edge Enabler Server mentioned above is an example of the edge enabler entity.

According to the exemplary method 800 illustrated in FIG. 8, the edge enabler entity receives a request for an exposure capability of 3GPP core network from an edge application entity, as shown in block 802. The request comprises a UE group identifier identifying a group of UEs. In some embodiments, the exposure capability of the 3GPP core network may be the 3GPP core network capability re-exposed via the edge enabler entity to the edge application entity, which includes the UE location exposure capability (corresponding to the UE location API), the user plane path management exposure capability (corresponding to the user plane path management API), the session with QoS exposure capability (corresponding to the session with QoS API), or any other re-exposed 3GPP core network capability over EDGE-3. In some embodiments, the UE group identifier uniquely identifies a group of UEs within a Public Land Mobile Network (PLMN) domain. For example, the UE group identifier may be an internal group identifier as defined in 3GPP TS23.501 v16.6.0, or an external group identifier as defined in 3GPP TS 23.501 v16.6.0, or any other identifier representing a group of UEs.

In some embodiments, the edge application entity may be implemented either on a dedicated hardware, as a software instance running on a dedicated hardware, or as a virtualized function instantiated on an appropriate platform, e.g. on a cloud infrastructure. The Edge Application Server mentioned above is an example of the edge application entity.

Then in block 804, the edge enabler entity communicates with the 3GPP core network based on the received request. Depending on the exposure capability that the request relates to, the edge enabler entity may perform the corresponding actions with a particular network entity of the 3GPP core network. Then the edge enabler entity transmits a response to the edge application entity, as shown in block 806.

Next, the improved solutions for the UE location API, the user plane path management API, and the session with QoS API will be described in detail, respectively. In the following description, the terms "Edge Enabler Server" and "Edge Application Server" may be used instead of "edge enabler entity" and "edge application entity".

Improvement in UE Location API

The existing UE location API utilizes 3GPP core network provided service which can support a group of UEs or even any UE as described in TS 23.502, clause 4.15:

"Target of Event Reporting: this may indicate a specific UE or PDU Session, a group of UE(s) or any UE (i.e. all UEs). Within a subscription all Event ID(s) are associated with the same Target of Event Reporting (possibly corresponding to multiple UE or multiple PDU Sessions)."

In view of this, in some embodiments of the present disclosure, the group-based UE location exposure is proposed.

Figure 9:
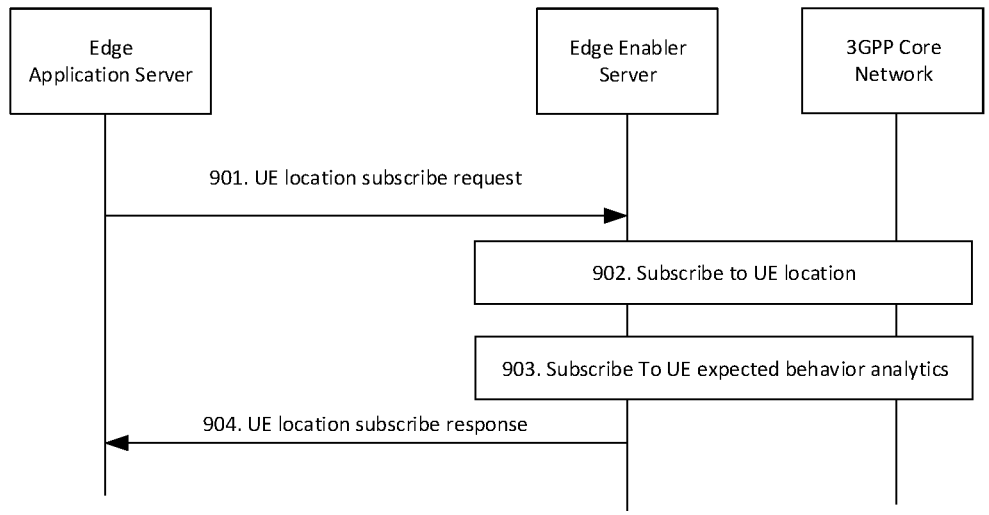
FIG. 9 is a diagram illustrating the improved subscribe operation for the UE location API according to some embodiments of the present disclosure.

FIG. 9 illustrates the improved subscribe operation between the edge application entity and the edge enabler entity for continuous UE location reporting according to some embodiments of the present disclosure.

As shown in FIG. 9, the Edge Application Server may send a UE location subscribe request to the Edge Enabler Server for tracking a UE's location continuously at 901. The UE location subscribe request includes a UE group identifier identifying a group of UEs or a UE identifier identifying a UE and may include proposed expiration time. The UE location subscribe request may also include location granularity to indicate requested format of the location, e.g. GPS Coordinates, Cell ID, Tracking Area ID, or civic addresses (e.g. streets, districts, etc.), which can be understood by the Edge Application Server and location accuracy to indicate the requested accuracy of location information.

Upon receipt of the UE location subscribe request including the UE group identifier, the Edge Enabler Server may check if the UE location subscribe request is authorized. If authorized, the Edge Enabler Server may subscribe to UE location for the group of UEs identified by the UE group identifier with the 3GPP core network at 902 by utilizing the UE location exposure capability of the 3GPP core network as specified in 3GPP TS23.558 v1.0.0 clause 8.9.3, e.g. Service Capability Exposure Function (SCEF)/NEF/SCEF+NEF or Location Service (LCS). Moreover, the Edge Enabler Server may subscribe to UE expected behavior analytics for the group of UEs with the 3GPP core network (e.g. NEF or Network Data Analytics Function (NWDAF)), as described in 3GPP TS23.288 v16.5.0, at 903. In an embodiment, the UE expected behavior analytics comprise UE mobility analytics.

Then the Edge Enabler Server may transmit a UE location subscribe response to the Edge Application Server at 904. The UE location subscribe response includes a subscription identifier and may include the expiration time indicating when the subscription will automatically expire. If the UE location subscribe request is not authorized, the Edge Enabler Server sends a failure response with rejection cause to the Edge Application Server.

The UE location subscribe request for the improved subscribe operation may be shown in Table 5 as below:

TABLE 5

UE location subscribe request

| Information element | Status | Description |
| --- | --- | --- |
| UE ID (NOTE) | O | Identifies the UE for which location will be reported (i.e. GPSI, or an access token which not only identifies the UE, but also provides the end user's consent for reporting UE's location to a given EAS) |
| UE Group ID (NOTE) | O | Identifies a group of UEs (i.e. internal group ID or external group ID) |
| Security credentials | M | Security credentials of the EAS |
| Notification Target Address | M | Notification Target Address of the EAS where the notification is to be sent by the EES |
| Event reporting information | O | Event Reporting Information as specified in Table 4.15.1-1 of 3GPP TS 23.502, e.g. event reporting mode. |
| Proposed expiration time | O | Proposed expiration time for the subscription |
| Location Granularity | O | indicates format of location e.g. GPS Coordinates, Cell ID, Tracking Area ID, or civic addresses (e.g. streets, districts, etc.) that can be understood by the Edge Application Server |
| Location accuracy | O | Indicates accuracy of the location information |

(NOTE):
Either UE ID or UE Group ID shall be provided.

Figure 10:
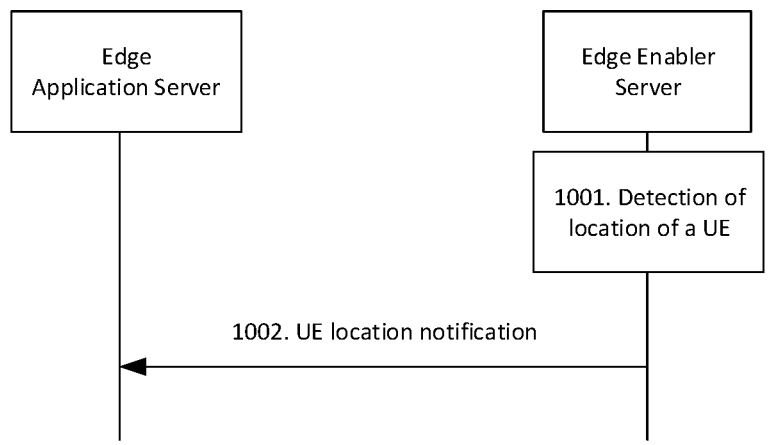
FIG. 10 is a diagram illustrating the improved notify operation for the UE location API according to some embodiments of the present disclosure.

FIG. 10 illustrates the improved notify operation between the Edge Enabler Server and the Edge Application Server for continuous location according to some embodiments of the present disclosure.

As shown in FIG. 10, the Edge Enabler Server may detect UE location of a UE in the group of UEs at 1001. In some embodiments, the Edge Enabler Server may receive the UE location information of the UE from the 3GPP core network. The received UE location information of the UE may indicate the actual location of the UE. In some embodiments, the Edge Enabler Server may receive analytics results of the UE expected behavior analytics from the 3GPP core network, and retrieve the UE location information of the UE from the analytics results of the UE expected behavior analytics. In some embodiments, the analytics results of the UE expected behavior analytics may comprise UE mobility statistics and UE mobility predictions. The UE mobility statistics may indicate location statistics of the group of UEs during an analytics target period, and the UE mobility predictions may indicate predicted location of the group of UEs during the analytics target period. Thus, the Edge Enabler Server may retrieve the UE location information of the UE from the UE mobility predictions, which indicates the predicted location of the UE. Then the Edge Enabler Server may cache the detected UE location information locally with a timestamp as the latest location information of the UE.

Then the Edge Enabler Server may determine whether to aggregate the UE location information for the group of UEs and determine an aggregation period, based on the UE mobility statistics of the analytics results of the UE expected behavior analytics, a local policy of the Edge Enabler Server, and UE location subscription information for the group of UEs received from the Edge Application Server. The aggregation period may indicate how long the aggregation of the UE location information should be. In some embodiments, the UE location subscription information may be received in the UE location subscribe request and comprise a group reporting guard time as specified in 3GPP TS23.502 v16.6.0, Table 4.15.1-1. The group reporting guard time is a parameter for group-based monitoring configuration to indicate the time for which the Monitoring Event Reporting(s) related with the UEs in a group can be aggregated before sending them to the consumer network function (NF).

If it is determined to aggregate the UE location information for the group of UEs, the Edge Enabler Server may aggregate the detected UE location information of one or more UEs of the group of UEs for the aggregation period. Then the Edge Enabler Server may transmit a UE location notification to the Edge Application Server at 1002. The UE location notification may comprise the aggregated UE location information. Each of the UE location information may comprise a UE identifier identifying the UE, a location of the UE, and a location type indicating whether the location of the UE is actual or predictive. Further, the UE location information may also include the location accuracy and the timestamp of the location. If it is determined not to aggregate the UE location information, the Edge Enabler Server may transmit the UE location notification comprising the detected UE location information of the UE to the Edge Application Server at 1002.

The UE location notification for the improved notify operation may be shown in Table 6 as below:

TABLE 6

UE location notification

| Information element | Status | Description |
| --- | --- | --- |
| Subscription ID | M | Subscription identifier corresponding to the subscription stored in the EES for the request |
| List of event notifications | M | A list of event notifications for one or more UEs. |
| > UE ID | M | The identifier of each UE (i.e. GPSI or identity token) |
| > UE location | M | Location of the UE |
| > Timestamp | O | Indicates the age of the location information |

TABLE 6-continued

UE location notification

| Information element | Status | Description |
|---|---|---|
| > Location accuracy | O | Indicates accuracy of the location information |
| > Location type | M | Indicates whether it is a predictive or actual UE location change. |

Figure 11:
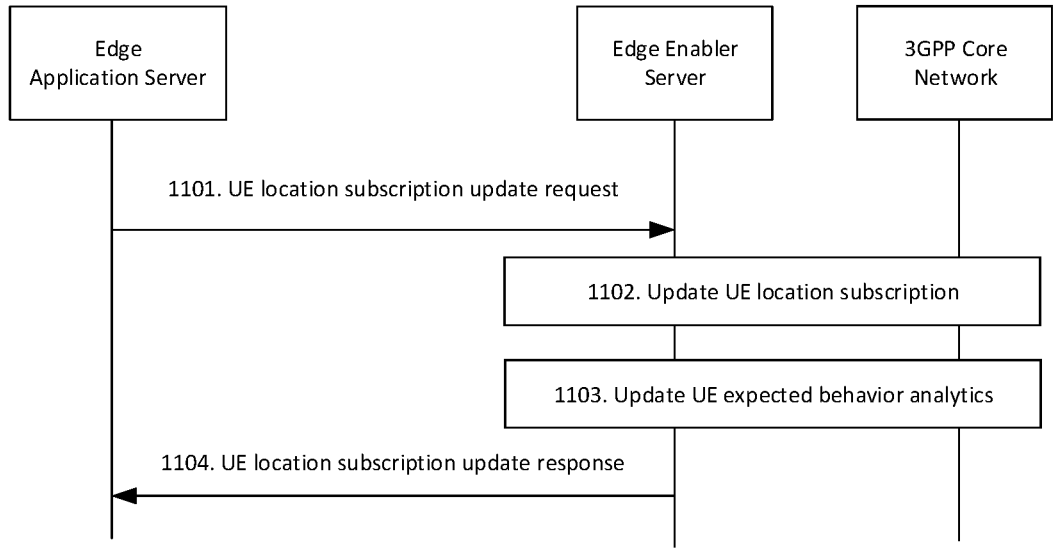
FIG. 11 is a diagram illustrating the improved subscription update operation for the UE location API according to some embodiments of the present disclosure.

FIG. 11 illustrates the improved subscription update operation between the Edge Application Server and the Edge Enabler Server for the UE location API according to some embodiments of the present disclosure.

As shown in FIG. 11, the Edge Application Server may send a UE location subscription update request to the Edge Enabler Server at 1101. The UE location subscription update request includes the subscription identifier of the subscription to be updated, and may also include proposed expiration time for the updated subscription, updated location granularity and location accuracy information.

Upon receipt of the UE location subscription update request, the Edge Enabler Server may check if the UE location subscription update request is authorized. If authorized, the Edge Enabler Server may update the UE location subscription associated with the UE location subscription update request in the 3GPP core network at 1102. If the UE location subscription update request relates to the UE location subscription for the group of UEs, the Edge Enabler Server may update the UE expected behavior analytics subscription for the group of UEs in the 3GPP Core Network at 1103. Then the Edge Enabler Server may transmit a UE location subscription update response to the Edge Application Server at 1104.

The UE location subscription update request for the improved subscription update operation may be shown in Table 7 as below, which does not comprise the UE identifier:

TABLE 7

UE location subscription update request

| Information element | Status | Description |
|---|---|---|
| Subscription ID | M | Subscription identifier corresponding to the subscription to be updated |
| Security credentials | M | Security credentials of the EAS |
| Event reporting information (NOTE) | O | Event Reporting Information as specified in Table 4.15.1-1 of 3GPP TS 23.502, e.g. event reporting mode. |
| Proposed expiration time (NOTE) | O | Proposed expiration time for the subscription |
| Notification Target Address (NOTE) | O | Notification Target Address of the EAS where the notification is to be sent by the EES |
| Location Granularity (NOTE) | O | indicates format of location e.g. GPS Coordinates, Cell ID, Tracking Area ID, or civic addresses (e.g. streets, districts, etc.) that can be understood by the Edge Application Server |
| Location accuracy (NOTE) | O | Indicates accuracy of the location information |

(NOTE):
At least one of these IEs is present.

Figure 12:
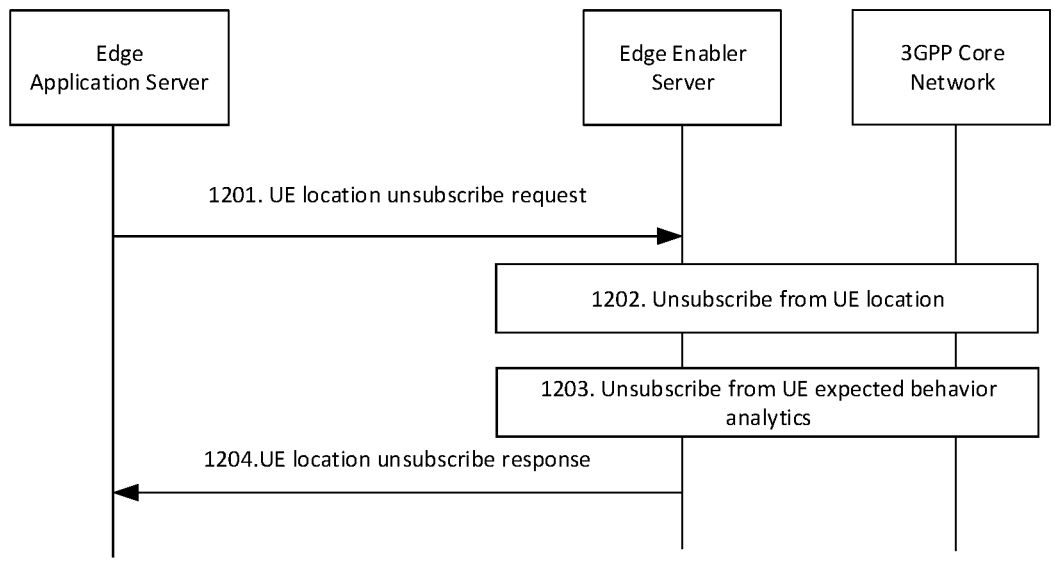
FIG. 12 is a diagram illustrating the improved unsubscribe operation for the UE location API according to some embodiments of the present disclosure.

FIG. 12 illustrates the improved unsubscribe operation between the Edge Application Server and the Edge Enabler Server to stop the UE location notifications according to some embodiments of the present disclosure.

As shown in FIG. 12, the Edge Application Server sends a UE location unsubscribe request to the Edge Enabler Server at 1201. Upon receipt of the UE location unsubscribe request, the Edge Enabler Server may check if the Edge Application Server is authorized or not. If authorized, the Edge Enabler Server may unsubscribe from the UE location associated with the UE location unsubscribe request at 1202.

Further, if the UE location unsubscribe request relates to the UE location subscription for the group of UEs, the Edge Enabler Server may unsubscribe from the UE expected behavior analytics for the group of UEs at 1203. Then the Edge Enabler Server may transmit a UE location unsubscribe response to the Edge Application Server at 1204.

In addition, in some embodiments, the aggregation of the location information may be also applicable to the single UE case. In this case, the UE location subscribe request may comprise a UE identifier identifying a UE. Upon receipt of the UE location subscribe request from the Edge Application Server, the Edge Enabler Server may subscribe to the UE location for the UE identified by the UE identifier, and subscribe to the UE expected behavior analytics for the UE with the 3GPP core network. The UE expected behavior analytics may comprise the UE mobility analytics. Then the Edge Enabler Server may transmit the UE location response to the Edge Application Server.

In the notify operation, the Edge Enabler Server may detect the UE location information of the UE. For example, the Edge Enabler Server may receive the UE location information of the UE as the actual UE's location from the 3GPP core network and/or retrieve the UE location information of the UE as the predicted UE's location from the UE mobility predictions received from the 3GPP core network. The Edge Enabler Server may determine whether to aggregate the UE location information of the UE and the aggregation period, based on the UE mobility statistics, the local policy of the Edge Enabler Server, and the UE location subscription information for the UE received in the UE location subscribe request. If it is determined to aggregate the UE location information of the UE, the Edge Enabler Server may aggregate the detected UE location information of the UE for the aggregation period and transmit the UE location notification comprising the aggregated UE location information to the Edge Application Server. If it is determined not to aggregate the UE location information of the UE, the Edge Enabler Server may transmit the UE location notification comprising the detected UE location information of the UE to the Edge Application Server.

In the subscription update operation, the Edge Enabler Server may receive the UE location subscription update request from the Edge Application Server. Then the Edge Enabler Server may update the UE location subscription of the UE with which the UE location subscription update request is associated, and update the UE expected behavior analytics subscription for the UE. Finally, the Edge Enabler Server may transmit the UE location subscription update response to the Edge Application Server.

In the unsubscribe operation, the Edge Enabler Server may receive the UE location unsubscribe request from the Edge Application Server. Then the Edge Enabler Server may unsubscribe from the UE location of the UE with which the UE location unsubscribe request is associated and unsubscribe from the UE expected behavior analytics for the UE. Finally, the Edge Enabler Server may transmit the UE location unsubscribe response to the Edge Application Server.

Improvement in the User Plane Path Management API

The existing user plane path management API also utilizes 3GPP core network provided service and if the NEF is used it can support a group of UEs as the target as described in TS 23.501 and TS 23.502. In view of this, in some embodiments of the present disclosure, the group-based user plane path management exposure is proposed.

Figure 13:
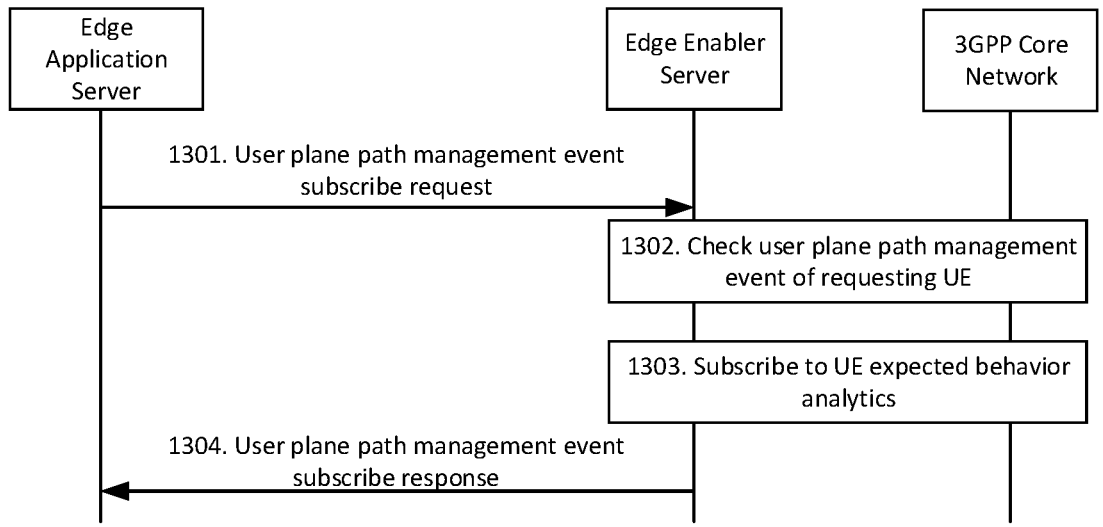
FIG. 13 is a diagram illustrating the improved subscribe operation for the user plane path management API according to some embodiments of the present disclosure.

FIG. 13 illustrates the improved subscribe operation between the Edge Application Server and the Edge Enabler Server for user plane path management event notifications according to some embodiments of the present disclosure.

As shown in FIG. 13, the Edge Application Server may send a user plane path management event subscribe request for tracking the UE's user plane path change continuously to the Edge Enabler Server at 1301. The user plane path management event subscribe request includes the UE group identifier for identifying a group of UEs or the UE identifier identifying the UE. The user plane path management event subscribe request may also include Subscription Type (Early and/or Late notification defined in clause 5.6.7 of 3GPP TS23.501 v16.6.0) and/or Indication of EAS Acknowledgement as specified in Table 8.6.3.3.1 of 3GPP TS23. 588 v1.0.0.

Upon receipt of the user plane path management event subscribe request including the UE group identifier, the Edge Enabler Server may check if the Edge Application Server is authorized for this operation. If authorized, the Edge Enabler Server may check a user plane path management event for the group of UEs identified by the UE group identifier at 1302. In an embodiment, the Edge Enabler Server may check if there exists a subscription with the 3GPP core network for the user plane path management event notifications corresponding to the group of UEs as described in 3GPP TS23.501 v16.6.0 and 3GPP TS 23.502 v16.6.0, which may be triggered by other Edge Application Server for the same group of UEs. The Edge Enabler Server may check the availability of the user plane path management event service for the UE. If a user plane path management event subscription with the 3GPP core network does not exist, the Edge Enabler Server subscribes with the 3GPP core network (e.g. PCF, NEF or SCEF+NEF) for the user plane path management event notifications of the group of UEs as described in 3GPP TS23.501 v16.6.0 and 3GPP TS23.502 v16.6.0. If the Edge Application Server provides the Subscription Type and/or Indication of EAS Acknowledgement in the user plane path management event subscribe request, the Edge Enabler Server includes the indication of "AF acknowledgement to be expected" as information on AF subscription to corresponding Session Management Function (SMF) events within an AF Request. If a user plane path management event subscription with the 3GPP core network exists, the Edge Enabler Server uses the locally cached user plane path management event notification information of the group of UEs to respond to the Edge Application Server. The Edge Enabler Server may store the subscription related to the Edge Application Server.

Then the Edge Enabler Server may subscribe to the UE expected behavior analytics for the group of UEs as specified in 3GPP TS23.288 v16.5.0 at 1303. In an embodiment, the UE expected behavior analytics may comprise both UE mobility analytics and UE communication analytics. Then the Edge Enabler Server may transmit a user plane path management event subscribe response to the Edge Application Server at 1304. If the Edge Application Server is not authorized, the Edge Enabler Server provides a rejection response with cause information.

The user plane path management event subscribe request for the improved subscribe operation may be shown as Table 8 as below:

TABLE 8

| User plane path management event subscribe request | | |
|---|---|---|
| Information element | Status | Description |
| UE ID (NOTE) | O | The identifier of the UE (i.e. GPSI or identity token) |
| UE Group ID (NOTE) | O | Identifies a group of UEs (i.e. internal group ID or external group ID) |
| Event ID(s) | M | Event ID(s) as specified in 3GPP TS 23.501 |
| Event Report | M | Event Reporting Information as specified in 3GPP TS 23.502 |
| Notification Target Address | M | Notification Target Address of the EAS where the notification is to be sent by the EES |
| Type of subscription | O | Indicates Early and/or Late notification to inform if the notification needs to be received before and/or after UP path configuration. |
| Indication of EAS acknowledgement | O | This IE indicates the EES to include indication of "AF acknowledgement to be expected" within the AF request for subscribing UP path management events to 3GPP network and that |

TABLE 8-continued

User plane path management event subscribe request

| Information element | Status | Description |
|---|---|---|
| | | the EAS will provide an acknowledgement as a response for the notifications of UP path management events to the EES. |
| Event Filter | O | Event filter as specified in 3GPP TS 23.501 |

(NOTE):
Either UE ID or UE Group ID shall be provided.

Figure 14:
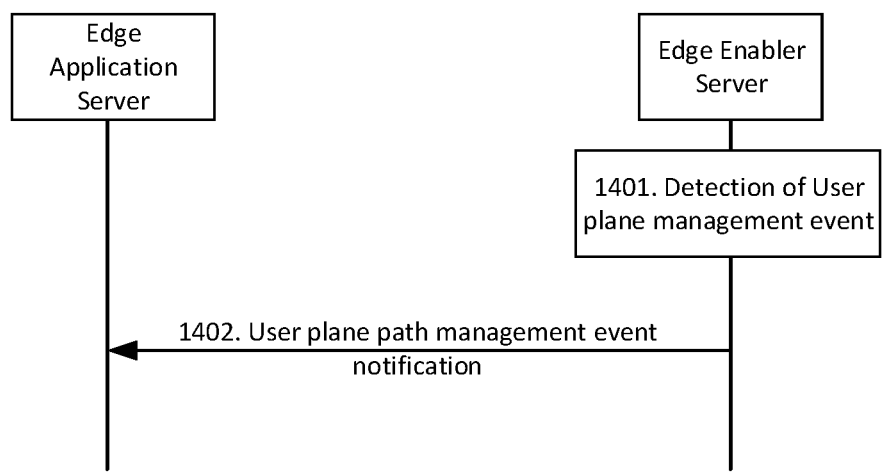
FIG. 14 is a diagram illustrating the improved notify operation for the user plane path management API according to some embodiments of the present disclosure.

FIG. 14 illustrates the improved notify operation between the Edge Enabler Server and the Edge Application Server for continuous user plane path management event notifications according to some embodiments of the present disclosure.

As shown in FIG. 14, the Edge Enabler Server may detect the user plane path management event of a UE in the group of UEs at 1401. In some embodiments, the Edge Enabler Server may receive a user plane path management event notification for the UE in the group of UEs from the 3GPP core network. The Edge Enabler Server may cache the detected user plane path management event notification locally with timestamp as the latest information of the UE. Then the Edge Enabler Server may determine whether to aggregate the user plane path management events for the group of UEs and determine an aggregation period, based on the analytics results of the UE expected behavior analytics received from the 3GPP core network, the local policy of the Edge Enabler Server, and user plane path management event subscription information for the group of UEs received from the Edge Application Entity. The aggregation period may indicate how long the aggregation of the user plane path management events should be. In some embodiments, the analytics results of the UE expected behavior analytics may comprise the UE mobility statistics and UE communication statistics. The UE communication statistics may indicate traffic statistics of the group of UEs. In some embodiments, the user plane path management subscription information may be received in the user plane path management event subscribe request and comprise the group reporting guard time as specified in 3GPP TS23.502 v16.6.0, Table 4.15.1-1 and the Indication of EAS acknowledgement. If the Indication of EAS acknowledgement indicates that the EAS acknowledgement is expected, the Edge Enabler Server should not aggregate the user plane path management events for the group of UEs since the aggregation may delay the whole process.

If it is determined to aggregate the user plane path management events for the group of UEs, the Edge Enabler Server may aggregate the detected user plane path management events of one or more UEs of the group of UEs for the aggregation period. Then the Edge Enabler Server may transmit a user plane path management event notification to the Edge Application Server at 1402. The user plane path management event notification may comprise the aggregated user plane path management events. If it is determined not to aggregate the user plane path management events for the group of UEs, the Edge Enabler Server may transmit the user plane path management event notification comprising the detected user plane path management event of the UE to the Edge Application Server at 1402.

The user plane path management event notification for the improved notify operation may be shown in Table 9 as below:

TABLE 9

User plane path management event notification

| Information element | Status | Description |
|---|---|---|
| Subscription ID | M | Subscription identifier corresponding to the subscription stored in the EES for the request |
| List of event notifications | M | A list of event notifications for one or more UEs. |
| > Event report | M | Event reporting information as specified in clause 5.2.8.3.1 of 3GPP TS 23.502 |
| > timestamp | O | The timestamp of each event report. |

Figure 15:
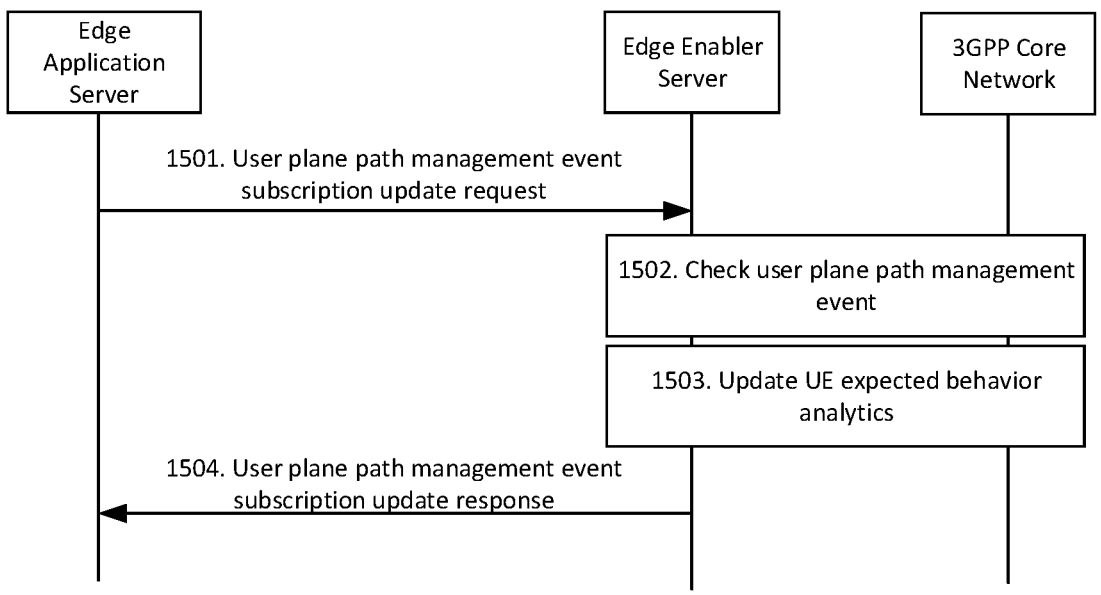
FIG. 15 is a diagram illustrating the improved subscription update operation for the user plane path management API according to some embodiments of the present disclosure.

FIG. 15 illustrates the improved subscription update operation between the Edge Application Server and the Edge Enabler Server for user plane path management event notifications according to some embodiments of the present disclosure.

As shown in FIG. 15, the Edge Application Server may send a user plane path management event subscription update request to update an existing user plane path management event subscription to the Edge Enabler Server at 1501. The user plane path management event subscription update request may include Subscription Type (Early and/or Late notification defined in clause 5.6.7 of 3GPP TS 23.501 v16.6.0) and/or Indication of EAS Acknowledgement.

Upon receipt of the user plane path management event subscription update request, the Edge Enabler Server may check if the Edge Application Server is authorized for the operation. If authorized, the Edge Enabler Server may check the user plane path management event associated with the user plane path management event subscription update request at 1502. In an embodiment, the Edge Enabler Server may check if there exists a subscription with the 3GPP core network for the user plane path management event notifications corresponding to the updated information obtained in 1501 as described in 3GPP TS23.501 v16.6.0 and 3GPP TS23.502 v16.6.0. If a subscription for the user plane path management event notifications with the 3GPP core network does not exist corresponding to the updated information, the Edge Enabler Server may subscribe with the 3GPP core network (e.g. PCF, NEF or SCEF+NEF) for the user plane path management event notifications. If the subscription with the 3GPP core network exists corresponding to the updated information, the Edge Enabler Server may use the locally cached user plane path management event notification information to respond to the Edge Application Server.

Then if the user plane path management event subscription update request relates to the user plane path management event subscription for the group of UEs, the Edge Enabler Server may update the UE expected behavior analytics subscription for the group of UEs in the 3GPP core network at 1503. Then the Edge Enabler Server may transmit a user plane path management event subscription response to the Edge Application Server at 1504.

Figure 16:
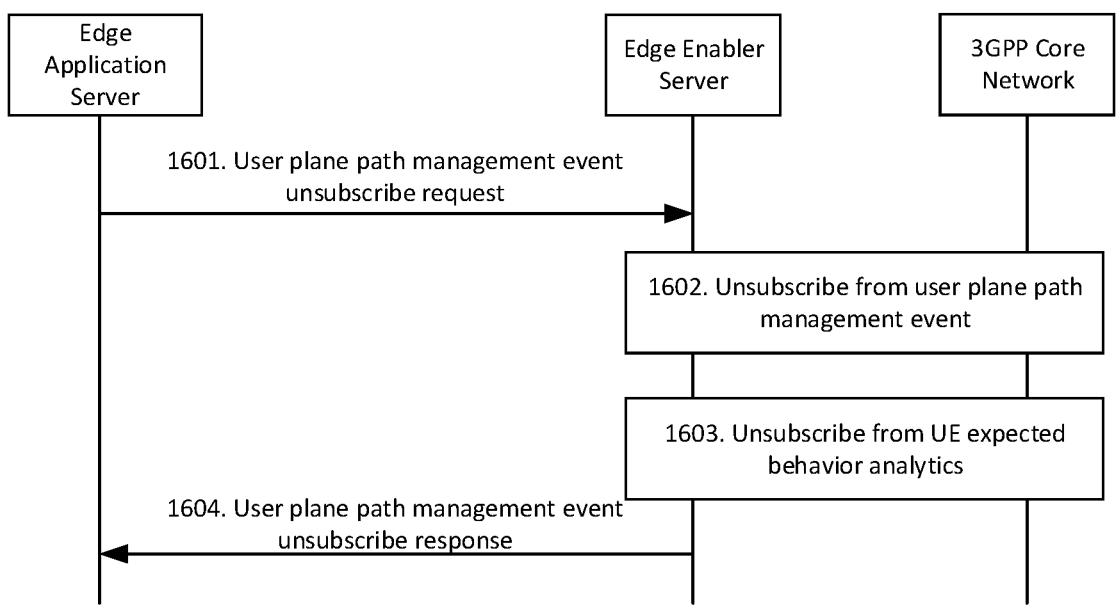
FIG. 16 is a diagram illustrating the improved unsubscribe operation for the user plane path management API according to some embodiments of the present disclosure.

FIG. 16 illustrates the improved unsubscribe operation between the Edge Application Server and the Edge Enabler Server for user plane path management event notifications according to some embodiments of the present disclosure.

As shown in FIG. 16, the Edge Application Server may send a user plane path management event unsubscribe request to the Edge Enabler Server to cancel the user plane path management event subscription at 1601. Upon receipt of the user plane path management event unsubscribe request, the Edge Enabler Server may unsubscribe the user plane path management event associated with the user plane path management event unsubscribe request from the 3GPP core network at 1602, if no other Edge Application Server requires to track the user plane path change of the group of UEs or the UE with which the user plane path management event unsubscribe request is associated. Further, if the user plane path management event unsubscribe request relates to the user plane path management event subscription for the group of UEs, the Edge Enabler Server may unsubscribe from the UE expected behavior analytics for the group of UEs at 1603. Then the Edge Enabler Server may transmit a user plane path management event unsubscribe response to the Edge Application Server at 1604.

With the improved UE location API and user plane path management API, the group-based location exposure can be supported, which provides advantages for the Edge Application Server to reduce the number of the UE location subscriptions or the user plane management event subscription, i.e. the subscription mentioned above is group based instead of per UE in the group of UEs. Further, the Edge Enabler Server as a supporting layer in the middle of the Edge Application Server and the 3GPP core network can aggregate the location information or the user plane path management events for the group of UEs before exposing them to the Edge Application Server. This is useful when a number of UEs is moving together (e.g. in a bus/train) and the aggregation of the location information or the user plane path management events can add more values for the re-exposed UE location API and user plane path management API.

In addition, in some embodiments, the aggregation of the user plane path management events may be also applicable to the single UE case. In this case, the user plane path management event subscribe request may comprise a UE identifier identifying a UE. Upon receipt of the user plane path management event subscribe request from the Edge Application Server, the Edge Enabler Server may check the user plane path management event for the UE identified by the UE identifier, and subscribe to the UE expected behavior analytics for the UE with the 3GPP core network. The UE expected behavior analytics may comprise the UE mobility analytics and the UE communication analytics. Then the Edge Enabler Server may transmit the user plane path management event subscribe response to the Edge Application Server.

In the notify operation, the Edge Enabler Server may detect the user plane path management event of the UE. For example, the Edge Enabler Server may receive the user plane path management event notification of the UE from the 3GPP core network. The Edge Enabler Server may determine whether to aggregate the user plane path management events of the UE and the aggregation period, based on the UE mobility statistics and UE communication statistics, the local policy of the Edge Enabler Server, and the user plane path management event subscription information for the UE received in the user plane path management event subscribe request. If it is determined to aggregate the user plane path management events of the UE, the Edge Enabler Server may aggregate the detected the user plane path management events of the UE for the aggregation period and transmit the user plane path management event notification comprising the aggregated user plane path management events to the Edge Application Server. If it is determined not to aggregate the user plane path management events of the UE, the Edge Enabler Server may transmit the UE location notification comprising the detected user plane path management event of the UE to the Edge Application Server.

In the subscription update operation, the Edge Enabler Server may receive the user plane path management event subscription update request from the Edge Application Server. Then the Edge Enabler Server may check the user plane path management event of the UE with which the user plane path management event subscription update request is associated, and update the UE expected behavior analytics subscription for the UE. Finally, the Edge Enabler Server may transmit the user plane path management event subscription update response to the Edge Application Server.

In the unsubscribe operation, the Edge Enabler Server may receive the user plane path management event unsubscribe request from the Edge Application Server. Then the Edge Enabler Server may unsubscribe from the user plane path management event of the UE with which the user plane path management event unsubscribe request is associated and unsubscribe from the UE expected behavior analytics for the UE. Finally, the Edge Enabler Server may transmit the user plane path management event unsubscribe response to the Edge Application Server.

Improvement in the Session with QoS API

The existing session with QoS API only supports a UE IP address as target UE for an ongoing session. In view of this, in some embodiments of the present disclosure, the session with QoS API can be enhanced to provide support for more representations of the target UE, such as a group of UEs.

Figure 17:
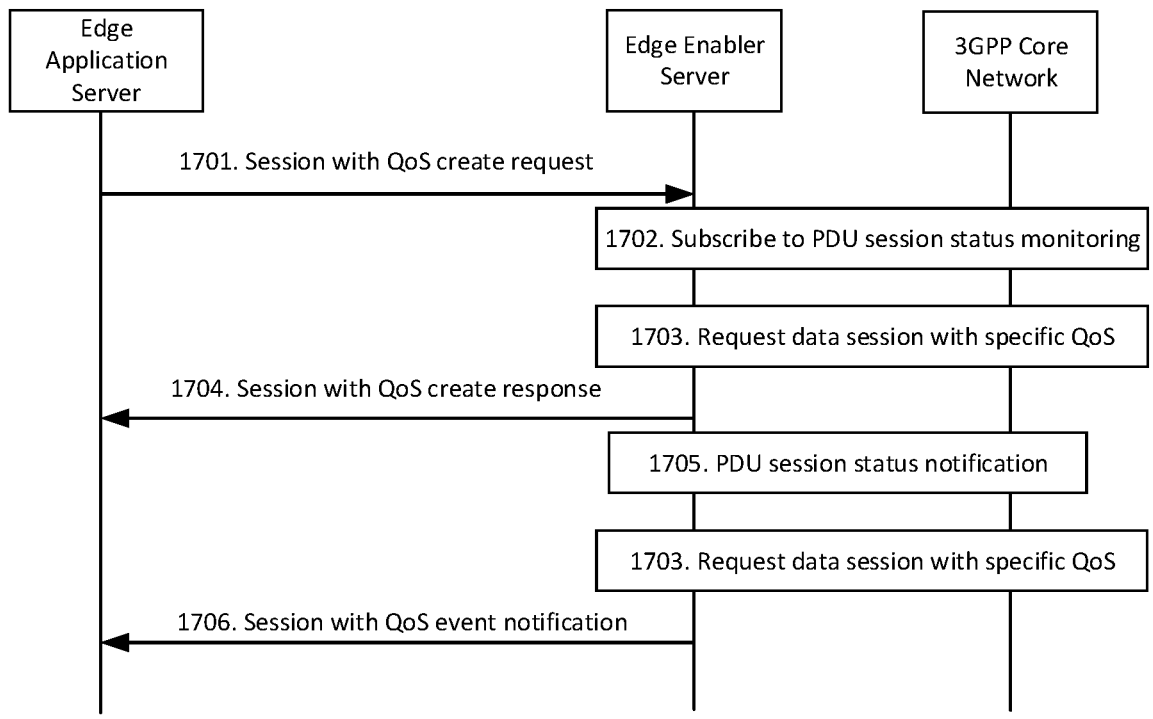
FIG. 17 is a diagram illustrating the improved create operation for the session with QoS API according to some embodiments of the present disclosure.

FIG. 17 illustrates the improved session with QoS create operation between the Edge Application Server and the Edge Enabler Server according to some embodiments of the present disclosure. This operation can be used to request reservation of resources for a data session between an Application Client and the Edge Application Server with a specific QoS and to subscribe to certain session with QoS event notifications.

As shown in FIG. 17, the Edge Application Server may send a session with QoS create request for establishment of a data session between the Application Client and the Edge Application Server with a specific QoS (either QoS reference or bandwidth) at 1701. The session with QoS create request may include a UE group identifier for identifying a group of UEs, or a UE identifier for identifying a UE, or an IP address of the UE, and Data Network Name (DNN) and Single Network Slice Selection Assistance Information (S-NSSAI) used for the data session between the Application Client and the Edge Application Server. With the same request, the Edge Application Server may subscribe to receive certain session with QoS event notifications (e.g. notifications that the QoS targets can no longer (or can again) be fulfilled).

Upon receipt of the session with QoS create request including the UE group identifier or the UE identifier, the Edge Enabler Server may check if the Edge Application Server is authorized for this operation for the group of UEs identified by the UE group identifier or the UE identified by the UE identifier. If authorized, at 1702, the Edge Enabler Server may subscribe to protocol data unit, PDU, session status monitoring for the group of UEs or the UE with the 3GPP core network (e.g. exposure function (NEF/SCEF/ SCEF+NEF), or SMF). Alternatively, the Edge Enabler Server may subscribe to Packet Data Network (PDN) connectivity status monitoring for the group of UEs or the UE. If one or more UEs in the group of UEs or the UE already has an ongoing data session with the Edge Application Server, the Edge Enabler Server may retrieve one or more IP addresses of the one or more UEs or an IP address of the UE from the 3GPP core network. Then the Edge Enabler Server may request a data session with a specific QoS for each of the one or more UEs or for the UE at 1703, and transmit a session with QoS create response to the Edge Application Server at 1704. The session with QoS create response may include a context identifier and a result for the requested data session(s) with the specific QoS. If any UE in the group of UEs or the UE has no ongoing data session, the Edge Enabler Server waits for further notification for PDU session status, and transmit the session with QoS create response to the Edge Application Server at 1704.

In addition, when the Edge Enabler Server does not retrieve any IP address of the UE at 1702, the Edge Enabler Server may receive from the 3GPP core network a PDU session status notification comprising an IP address of a UE in the group of UEs or the IP address of the UE identified by the UE identifier at 1705. Then the Edge Enabler Server may request a data session with a specific QoS for the UE, and transmit a session with QoS event notification for the UE to the Edge Application Server at 1706. The session with QoS event notification may indicate events related to the requested data session with the specific QoS for the UE, for example, the context identifier for the requested data session.

The session with QoS create request for the improved create operation may be shown in Table 10 as below:

TABLE 10

Session with QoS create request

| Information element | Status | Description |
| --- | --- | --- |
| UE IP address (NOTE X) | O | The UE IP address. |
| UE ID (NOTE X) | O | The identifier of the UE (i.e. GPSI) |
| UE Group ID (NOTE X) | O | Identifies a group of UEs (i.e. internal group ID or external group ID) |
| IP flow description | M | The IP flow description for the application traffic. |
| Requested QoS reference (NOTE 1) | O | Refers to pre-defined QoS information for the data session between AC and EAS (NOTE 2). |
| Event list | O | A list of associated events to which the EAS subscribes (see 3GPP TS 23.503, clause 6.1.3.18). |
| Notification Target Address | O | Notification Target Address of the EAS where the notification is to be sent by the EES. |
| DNN | O | DNN for the data session between AC and EAS |
| S-NSSAI | O | S-NSSAI for the data session between AC and EAS |
| Requested bandwidth (NOTE 1) | O | Bandwidth requested for the data session between AC and EAS |

(NOTE 1):
Only one of requested QoS reference or requested bandwidth shall be provided.
(NOTE 2):
The pre-defined QoS information may be configured in the EES or in the 3GPP Core Network.
(NOTE X):
Only one of UE IP address, UE ID or UE Group ID shall be provided.

Figure 18:
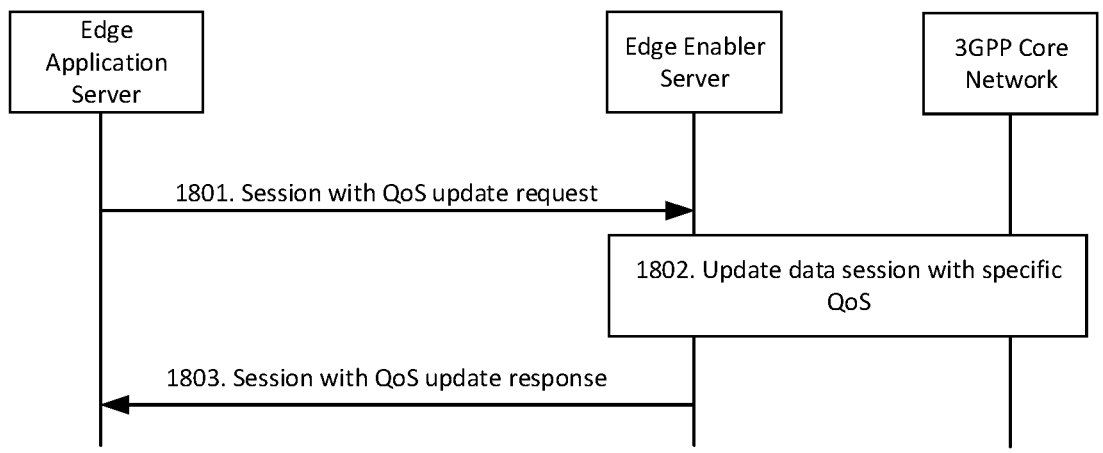
FIG. 18 is a diagram illustrating the improved update operation for the session with QoS API according to some embodiments of the present disclosure.

FIG. 18 illustrates the improved session with QoS update operation between the Edge Application Server and the Edge Enabler Server according to some embodiments of the present disclosure. This operation is used to request a modification of the QoS of the data session between the Application Client and the Edge Application Server.

As shown in FIG. 18, the Edge Application Server may send a session with QoS update request to request a modification of the QoS of the data session between the Application Client and the Edge Application Server at 1801. The session with QoS update request may include the context identifier and a different QoS reference or different bandwidth value. Upon receipt of the session with QoS update request, the Edge Enabler Server may check if there is a context for the context identifier available and whether the Edge Application Server is authorized for this operation. If yes, the Edge Enabler Server may check if the IP address of the UE with which the session with QoS update request is associated is known by the Edge Enabler Server. If the IP address of the UE is known by the Edge Enabler Server, the Edge Enabler Server may update the data session with the specific QoS of the UE at 1802. For example, the Edge Enabler Server may invoke Policy Authorization Update service or AF Session with QoS Update service with the 3GPP Core Network (PCF or NEF, respectively) as described in 3GPP TS23.501 v16.6.0 and 3GPP TS23.502 v16.6.0, providing the updated information to the PCF or NEF, respectively. The Edge Enabler Server may subscribe to additional events or unsubscribe to certain events, if necessary. Then the Edge Enabler Server may transmit a session with QoS update response to the Edge Application Server at 1803. If the operation is successful, the Edge Enabler Server responds with a context identifier and a result in the session with QoS update response. If the Edge Application Server is not authorized or any other failure happens during the operation, the Edge Enabler Server provides a rejection response with cause information.

Figure 19:
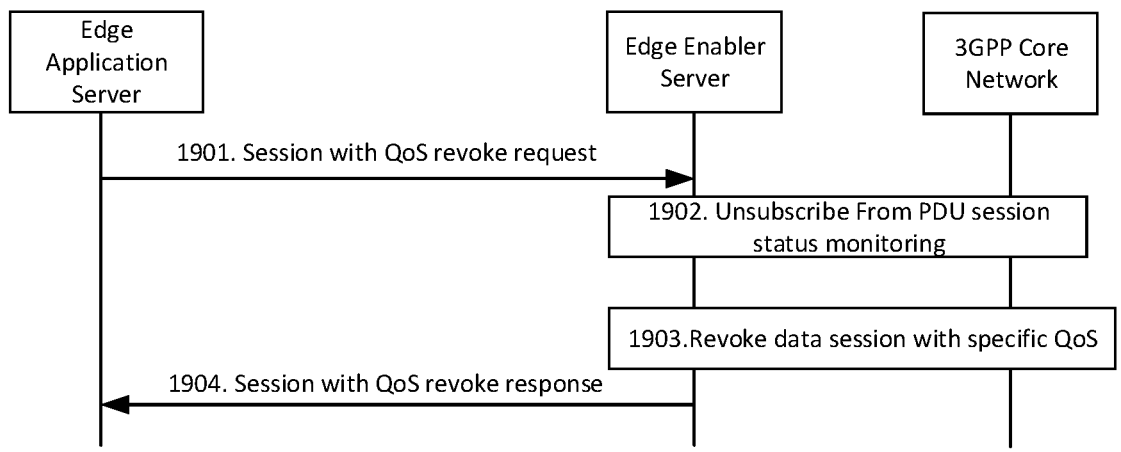
FIG. 19 is a diagram illustrating the improved revoke operation for the session with QoS API according to some embodiments of the present disclosure.

FIG. 19 illustrates the improved session with QoS revoke operation between the Edge Application Server and the Edge Enabler Server according to some embodiments of the present disclosure. This operation is used to revoke the data session between the Application Client and the Edge Application Server with a specific QoS and to unsubscribe to the related session with QoS event notifications.

As shown in FIG. 19, the Edge Application Server may send a session with QoS revoke request to request a revoke of the data session with QoS between the Application Client and the Edge Application Server at 1901. The session with QoS revoke request may include the context identifier. Upon receipt of the session with QoS revoke request, the Edge Enabler Server may check if there is a context for the context identifier available and whether the Edge Application Server is authorized for this operation. If yes, the Edge Enabler Server may unsubscribe from the PDU session status monitoring for the group of UEs or the UE with which the session with QoS revoke request is associated at 1902, and revoke the data session with the specific QoS associated with the session with QoS revoke request at 1903 by invoking Policy Authorization Delete service or AF Session with QoS Revoke service with the 3GPP Core Network (PCF or NEF, respectively) as described in 3GPP TS23.501 v16.6.0 and 3GPP TS23.502 v16.6.0. Then the Edge Enable Server may transmit a session with QoS revoke response to the Edge Application Server at 1904. If the operation is successful, the Edge Enabler Server responds with a context ID and a result in the session with QoS revoke response. If the Edge Application Server is not authorized or any other failure happens during the operation, the Edge Enabler Server provides a rejection response with cause information.

With the improved session with QoS API, it can support to apply a required QoS for both an ongoing session and a future session for a single UE or a group of UEs.

According to the embodiments of the present disclosure as described above, the Edge Enabler Server can utilize: 1) user plane path management events by subscribing with the 3GPP core network for the user plane path management event notifications of the UE as described in 3GPP TS23.501 v16.6.0 and 3GPP TS23.502 v16.6.0; 2) the location information from the UE location API exposed by the 3GPP core network, e.g. SCEF/NEF/SCEF+NEF or LCS (Location Service) as specified in 3GPP TS23.682 v16.8.0, 3GPP TS23.502 v16.6.0, 3GPP TS23.271 v16.0.0, 3GPP TS36.305 v16.1.0, 3GPP TS23.273 v16.4.0 and 3GPP TS38.305 v16.1.0 to obtain the locations of the group of UE or the UE's location; 3) capabilities exposed by the 3GPP core network, e.g. NEF or PCF, to establish an AF session with QoS, and QoS related event notifications subscribed with the 3GPP core network as specified in 3GPP TS23.501 v16.6.0, 3GPP TS23.502 v16.6.0 and 3GPP TS23.503 v16.6.0; 4) capabilities exposed by the 3GPP core network, e.g. NEF or NWDAF, to analyze the UE expected behavior as specified in 3GPP TS 23.288 v16.5.0; and 5) PDU session status/PDN connectivity status monitoring capability exposed by the 3GPP core network (e.g. exposure function (NEF/SCEF/SCEF+NEF), or SMF) as specified in 3GPP TS23.501 v16.6.0 and 3GPP TS23.502 v16.6.0.

Figure 20:
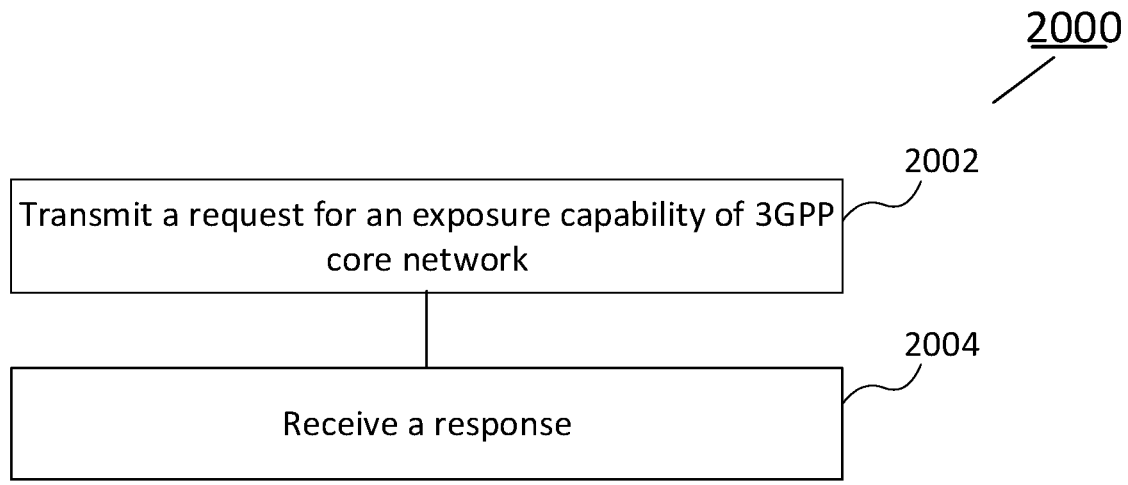
FIG. 20 is a flowchart illustrating a method implemented at an edge application entity according to some embodiments of the present disclosure.

FIG. 20 is a flowchart illustrating a method 2000 for improved capability exposure according to some embodiments of the present disclosure. The method 2000 illustrated in FIG. 20 may be performed by an apparatus implemented in or communicatively coupled to the edge application entity.

According to the exemplary method 2000 illustrated in FIG. 20, the edge application entity transmits a request for an exposure capability of 3GPP core network to the edge enabler entity, as shown in block 2002. The request comprises a UE group identifier identifying a group of UEs. Then the edge application entity receives a response from the edge enable entity, as shown in block 2004.

In some embodiments, the UE group identifier may be the internal group identifier as defined in 3GPP TS23.501 v16.6.0, the external group identifier as defined in 3GPP TS23.501 v16.6.0, or any other identifier representing a group of UEs.

In some embodiments, the exposure capability may be the UE location exposure capability. In this case, the request may be the UE location subscribe request, and the response may be the UE location subscribe response. Further, in some embodiments, the edge application entity may receive the UE location notification comprising the aggregated UE location information of one or more UEs of the group of UEs and/or the UE location notification comprising the detected UE location information of a UE in the group of UEs from the edge enabler entity.

In some embodiments, the exposure capability may be the user plane path management exposure capability. In this case, the request may be the user plane path management event subscribe request, and the response may be the user plane path management event subscribe response. Further, in some embodiments, the edge application entity may receive the user plane path management event notification comprising the aggregated user plane path management events of one or more UEs in the group of UEs and/or the user plane path management event notification comprising the detected user plane path management event of a UE in the group of UEs from the edge enabler entity.

In some embodiments, the exposure capability may be the session with QoS exposure capability. In this case, the request may be the session with QoS create request, and the response may be the session with QoS create response. Further, in some embodiment, after receiving the session with QoS create response, the edge application entity may receive the session with QoS event notification for a UE in the group of UEs from the edge enabler entity, and the session with QoS event notification may indicate the events related to the requested data session with the specific QoS of the UE.

Figure 21:
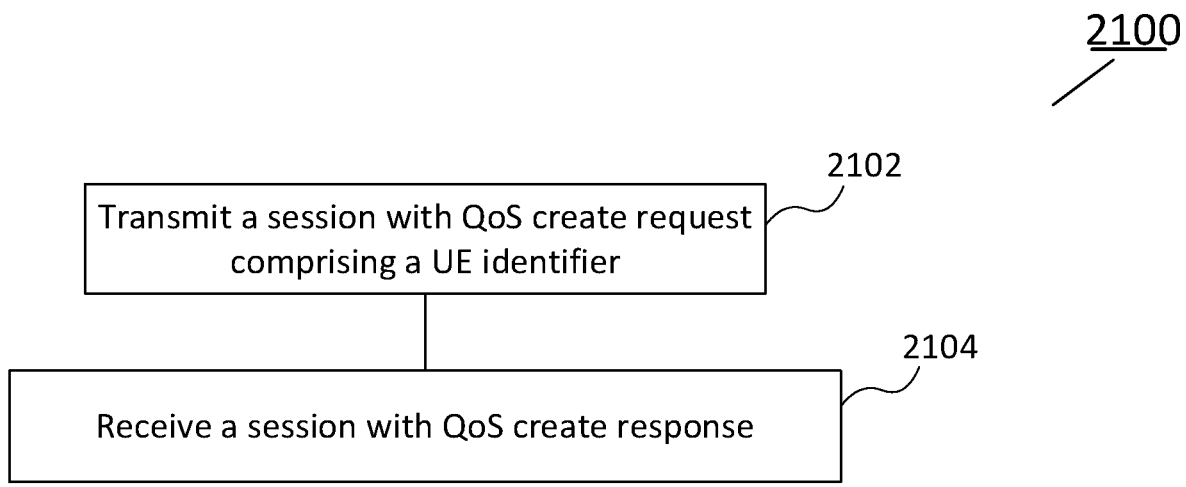
FIG. 21 is a flowchart illustrating a method implemented at an edge application entity according to some embodiments of the present disclosure.

FIG. 21 is a flowchart illustrating a method 2100 for improved capability exposure according to some embodiments of the present disclosure. The method 2100 illustrated in FIG. 21 may be performed by an apparatus implemented in or communicatively coupled to the edge application entity.

According to the exemplary method 2100 illustrated in FIG. 21, the edge application entity transmits the session with QoS create request to the edge enabler entity, as shown in block 2102. The session with QoS create request comprises a UE identifier identifying a UE. Then the edge application entity receives the session with QoS create response from the edge enabler entity, as shown in block 2104.

Further, in some embodiments, after receiving the session with QoS create response, the edge application entity may receive the session with QoS event notification for the UE from the edge enabler entity, and the session with QoS event notification may indicate the events related to the requested data session with the specific QoS of the UE.

Please note that the order for performing the steps or actions as shown in FIGS. 8-21 is illustrated only as an example. In some implementation, some steps may be performed in a reverse order or in parallel. In some other implementation, some steps may be omitted or combined.

The various blocks or actions shown in FIGS. 8-21 may be viewed as method steps, and/or as operations that result from operation of computer program code, and/or as a plurality of coupled logic circuit elements constructed to carry out the associated function(s). The schematic flow chart diagrams described above are generally set forth as logical flow chart diagrams. As such, the depicted order and labeled steps are indicative of specific embodiments of the presented methods. Other steps and methods may be conceived that are equivalent in function, logic, or effect to one or more steps, or portions thereof, of the illustrated methods. Additionally, the order in which a particular method occurs may or may not strictly adhere to the order of the corresponding steps shown.

Figure 22:
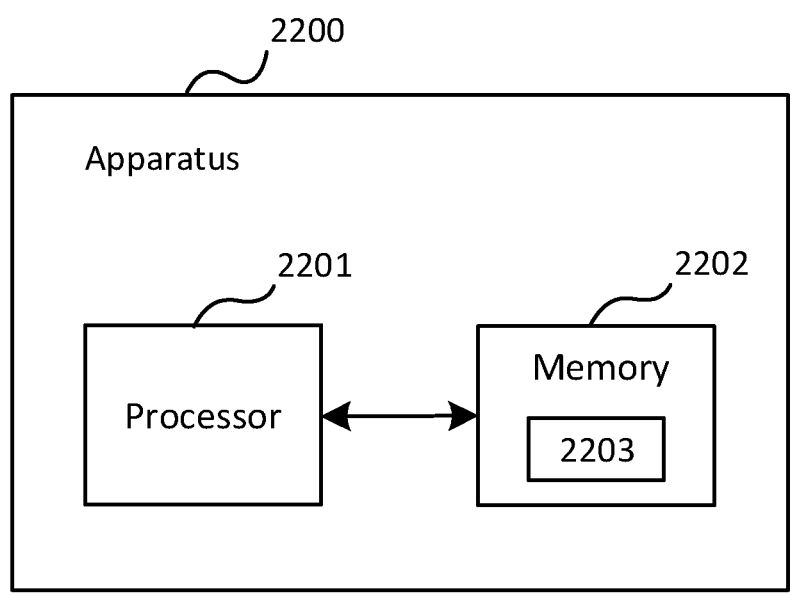
FIG. 22 is a block diagram illustrating an apparatus according to some embodiments of the present disclosure.

FIG. 22 is a block diagram illustrating an apparatus 2200 according to various embodiments of the present disclosure. As shown in FIG. 22, the apparatus 2200 may comprise one or more processors such as processor 2201 and one or more memories such as memory 2202 storing computer program codes 2203. The memory 2202 may be non-transitory machine/processor/computer readable storage medium. In accordance with some exemplary embodiments, the apparatus 2200 may be implemented as an integrated circuit chip or module that can be plugged or installed into the edge enabler entity or the edge application entity as described with respect to FIGS. 5-21.

In some implementations, the one or more memories 2202 and the computer program codes 2203 may be configured to, with the one or more processors 2201, cause the apparatus 2200 at least to perform any operation of the method as described in connection with FIGS. 5-21. In such embodiments, the apparatus 2200 may be implemented as at least part of or communicatively coupled to the edge enabler entity or the edge application entity as described above. As a particular example, the apparatus 2200 may be implemented as an edge enabler entity or an edge application entity.

Alternatively or additionally, the one or more memories 2202 and the computer program codes 2203 may be configured to, with the one or more processors 2201, cause the apparatus 2200 at least to perform more or less operations to implement the proposed methods according to the exemplary embodiments of the present disclosure.

In general, the various exemplary embodiments may be implemented in hardware or special purpose chips, circuits, software, logic or any combination thereof. For example, some aspects may be implemented in hardware, while other aspects may be implemented in firmware or software which may be executed by a controller, microprocessor or other computing device, although the disclosure is not limited thereto. While various aspects of the exemplary embodiments of this disclosure may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

As such, it should be appreciated that at least some aspects of the exemplary embodiments of the disclosure may be practiced in various components such as integrated circuit chips and modules. It should thus be appreciated that the exemplary embodiments of this disclosure may be realized in an apparatus that is embodied as an integrated circuit, where the integrated circuit may comprise circuitry (as well as possibly firmware) for embodying at least one or more of a data processor, a digital signal processor, baseband circuitry and radio frequency circuitry that are configurable so as to operate in accordance with the exemplary embodiments of this disclosure.

It should be appreciated that at least some aspects of the exemplary embodiments of the disclosure may be embodied in computer-executable instructions, such as in one or more program modules, executed by one or more computers or other devices. Generally, program modules include routines, programs, objects, components, data structures, etc. that perform particular tasks or implement particular abstract data types when executed by a processor in a computer or other device. The computer executable instructions may be stored on a computer readable medium such as a hard disk, optical disk, removable storage media, solid state memory, random access memory (RAM), etc. As will be appreciated by one of skill in the art, the function of the program modules may be combined or distributed as desired in various embodiments. In addition, the function may be embodied in whole or partly in firmware or hardware equivalents such as integrated circuits, field programmable gate arrays (FPGA), and the like.

The present disclosure includes any novel feature or combination of features disclosed herein either explicitly or any generalization thereof. Various modifications and adaptations to the foregoing exemplary embodiments of this disclosure may become apparent to those skilled in the relevant arts in view of the foregoing description, when read in conjunction with the accompanying drawings. However, any and all modifications will still fall within the scope of the non-limiting and exemplary embodiments of this disclosure.

What is claimed is:

1. A method implemented at an edge enabler server, the method comprising:
   receiving a request for an exposure capability of 3GPP core network from an edge application server, the request comprising a user equipment (UE) group identifier identifying a group of UEs, wherein the exposure capability is UE location exposure capability or user plane path management exposure capability, and wherein the UE group identifier is an internal group identifier or an external group identifier;
   communicating with the 3GPP core network based on the request;
   transmitting a response to the edge application server;
   determining whether to aggregate notification information and determining an aggregation period; and
   in response to determining to aggregate the notification information, transmitting a notification to the edge application entity, wherein the notification comprises the aggregated notification information.

2. The method of claim 1, wherein
   the exposure capability is the UE location exposure capability,
   the request is a UE location subscribe request,
   the response is a UE location subscribe response, and
   communicating with the 3GPP core network comprises subscribing to UE location for the group of UEs identified by the UE group identifier and subscribing to UE expected behavior analytics for the group of UEs.

3. The method of claim 2, further comprising detecting UE location information of a UE in the group of UEs, wherein
   the determining whether to aggregate notification information for the group of UEs and determining an aggregation period comprises:
   determining whether to aggregate the UE location information for the group of UEs and determining an aggregation period, based on analytics results of the UE expected behavior analytics received from the 3GPP core network, a local policy of the edge enabler server, and UE location subscription information for the group of UEs received from the edge application server;
   in response to determining to aggregate the UE location information, wherein the transmitting the notification to the edge application entity, wherein the notification comprises the aggregated notification information comprises: aggregating the detected UE location information of one or more UEs of the group of UEs for the aggregation period and transmitting a UE location notification to the edge application server, wherein the UE location notification comprises the aggregated UE location information in which each piece of UE location information comprises a UE identifier identifying the UE, a location of the UE, and a location type indicating whether the location is actual or predictive.

4. The method of claim 3, further comprising:
in response to determining not to aggregate the UE location information, transmitting a UE location notification comprising the detected UE location information of the UE to the edge application entity.

5. The method of claim 3, wherein detecting UE location information of a UE in the group of UEs comprises:
receiving the UE location information of the UE in the group of UEs from the 3GPP core network; and/or
retrieving the UE location information of the UE in the group of UEs from the analytics results of the UE expected behavior analytics,
wherein the analytics results of the UE expected behavior analytics comprise UE mobility statistics and UE mobility predictions, and
wherein the determining is based on the UE mobility statistics, and the retrieving is based on the UE mobility predictions.

6. The method of claim 3, wherein the UE location subscription information comprises a group reporting guard time.

7. The method of claim 2, further comprising:
receiving a UE location subscription update request from the edge application server;
updating the UE location subscription associated with the UE location subscription update request;
updating, in response the UE location subscription update request relating to the UE location subscription for the group of UEs, the UE expected behavior analytics subscription; and
transmitting a UE location subscription update response to the edge application server.

8. The method of claim 2, further comprising:
receiving a UE location unsubscribe request from the edge application server;
unsubscribing from the UE location associated with the UE location unsubscribe request;
unsubscribing, in response to the UE location unsubscribe request relating to the UE location subscription for the group of UEs, from the UE expected behavior analytics; and
transmitting a UE location unsubscribe response to the edge application server.

9. The method of claim 1, wherein
the exposure capability is the user plane path management exposure capability,
the request is a user plane path management event subscribe request,
the response is a user plane path management event subscribe response,
the communicating with the 3GPP core network comprises: checking a user plane path management event for the group of UEs identified by the UE group identifier; and subscribing to UE expected behavior analytics for the group of UEs, and the UE expected behavior analytics comprises both UE mobility analytics and UE communication analytics.

10. The method of claim 9, further comprising:
detecting the user plane path management event of a UE in the group of UEs;
wherein the determining whether to aggregate notification information for the group of UEs and determining an aggregation period comprise: determining whether to aggregate the user plane path management events for the group of UEs and determining an aggregation period, based on analytics results of the UE expected behavior analytics received from the 3GPP core network, a local policy of the edge enabler server, and user plane path management event subscription information for the group of UEs received from the edge application server;
in response to determining to aggregate the user plane path management events, wherein the in response to determining to aggregate the notification information, transmitting a notification to the edge application entity, wherein the notification comprises the aggregated notification information comprise: aggregating the detected user plane path management events of one or more UEs of the group of UEs for the aggregation period; and transmitting a user plane path management event notification to the edge application server, wherein the user plane path management event notification comprises the aggregated user plane path management events.

11. The method of claim 10, further comprising, in response to determining not to aggregate the user plane path management events, transmitting a user plane path management event notification comprising the detected user plane path management event of the UE to the edge application server.

12. The method of claim 10, wherein
detecting the user plane path management event of a UE in the group of UEs comprises: receiving a user plane path management event notification for the UE in the group of UEs from the 3GPP core network;
wherein the analytics results of the UE expected behavior analytics comprise UE mobility statistics and UE communication statistics;
wherein the user plane path management event subscription information comprises a group reporting guard time and an indication of edge application server (EAS) acknowledgement.

13. The method of claim 9, further comprising:
receiving a user plane path management event subscription update request from the edge application server;
checking the user plane path management event associated with the user plane path management event subscription update request;
updating, in response the user plane path management event subscription update request relating to the user plane path management event subscription for the group of UEs, the UE expected behavior analytics subscription; and
transmitting a user plane path management event subscription update response to the edge application server.

14. The method of claim 9, further comprising:
receiving a user plane path management event unsubscribe request from the edge application server;
unsubscribing from the user plane path management event associated with the user plane path management event unsubscribe request;

unsubscribing, in response to the user plane path management event unsubscribe request relating to the user plane path management event subscription for the group of UEs, from the UE expected behavior analytics; and transmitting a user plane path management event unsubscribe response to the edge application server.

15. A method implemented at an edge application server, comprising:

transmitting a request for an exposure capability of 3GPP core network to an edge enabler server, the request comprising a user equipment (UE) group identifier identifying a group of UEs;

wherein the exposure capability is UE location exposure capability, or user plane path management exposure capability; wherein the UE group identifier is an internal group identifier, or an external group identifier;

receiving a response from the edge enable entity; and receiving a notification from the edge enabler entity, wherein the notification comprises aggregated notification information.

16. The method of claim 15, wherein the exposure capability is the UE location exposure capability, and wherein the request is a UE location subscribe request, and the response is a UE location subscribe response;

wherein receiving the notification comprises the aggregated notification information comprises:

receiving a UE location notification from the edge enabler server, wherein the UE location notification comprises aggregated UE location information of one or more UEs in the group of UEs in which each piece of UE location information comprises a UE identifier identifying a UE in the group of UEs, a location of the UE, and a location type indicating whether the UE location is actual or predictive; and/or receiving a UE location notification comprising detected UE location information of a UE in the group of UEs from the edge enabler server.

17. The method of claim 15, wherein the exposure capability is the user plane path management exposure capability, and wherein the request is a user plane path management event subscribe request, and the response is a user plane path management event subscribe response;

wherein receiving the notification comprises the aggregated notification information comprises at least one of:

receiving a user plane path management event notification from the edge enabler server, wherein the user plane path management event notification comprises aggregated user plane path management events of one or more UEs in the group of UEs; and receiving a user plane path management event notification comprising detected user plane path management event of a UE in the group of UEs from the edge enabler server.

18. An edge enabler server comprising:

one or more processors; and one or more memories comprising computer program codes, the one or more memories and the computer program codes configured to, with the one or more processors, cause the edge enabler server to perform the method of claim 1.

19. An edge application server comprising:

one or more processors; and one or more memories comprising computer program codes, the one or more memories and the computer program codes configured to, with the one or more processors, cause the edge application server to perform the method of claim 15.

* * * * *